US005636338A

United States Patent [19]
Moreton

[11] Patent Number: 5,636,338
[45] Date of Patent: Jun. 3, 1997

[54] METHOD FOR DESIGNING CURVED SHAPES FOR USE BY A COMPUTER

[75] Inventor: Henry P. Moreton, Oakland, Calif.

[73] Assignee: Silicon Graphics, Inc., Mountain View, Calif.

[21] Appl. No.: 10,800

[22] Filed: Jan. 29, 1993

[51] Int. Cl.$^6$ .................................................. G06T 17/00
[52] U.S. Cl. .................................... 395/142; 395/120
[58] Field of Search .................................. 395/119, 120, 395/127, 133, 138, 139, 140, 141, 142, 143, 150, 151

[56] References Cited

U.S. PATENT DOCUMENTS

| 4,864,520 | 9/1989 | Setosuchi et al. | 395/119 X |
|---|---|---|---|
| 5,251,160 | 10/1993 | Rockwood et al. | 395/143 X |

OTHER PUBLICATIONS

Ohlin, "2D and 3D Curve Interpolation by Consistent Splines", IBM Nederland NV Cad/Cam Systems Support Group Amsterdam, Mar. 1985.

Ohlin, "Splines for Engineers", Eurographics '87, pp. 555–565, 1987.

Celinker; "Deformable Curve and Surface Finite–Elements for Free–Form Shape Design", Computer Graphics, vol. 25, No. 4, pp. 257–266, Jul. 29–Aug. 2, 1991.

Nielson, "A Method for Interpolating Scattered Data Based Upon a Minimum Norm Network", Mathematics of Computation, vol. 40, No. 161, pp. 253–271, Jan. 1983.

Pottman, "Scattered Data Interpolation Based Upon Generalized Minimum Norm Networks", Technische Hochschule Darmstadt, Reprint No. #1232, May 1989.

Pramila, "Ship Hull Surface Using Finite Elements", International Shipbuilding Progress, vol. 25, No. 284, pp. 97–107, 1978.

Hagen, et al., "Automatic Smoothing With Geometric Surface Patches", Computer Aided Geometric Design, vol. 4, pp. 231–236, 1987.

Rando, et al., "Fair Curves and Surfaces", Approximation Theory VI, vol. 2, pp. 553–556, 1989.

Rando, et al., "Designing Faired Parametric Surfaces", Computer Aided Design, vol. 23, No. 7, pp. 492–497, Sep. 1991.

*Primary Examiner*—Almis R. Jankus
*Attorney, Agent, or Firm*—Sterne, Kessler, Goldstein & Fox P.L.L.C

[57] ABSTRACT

Methods for forming computer models of curves, networks, or surfaces from user defined specifications of the shape to be modeled. Each specification includes a set of geometric constraints, such as positions, tangents curvatures, and torsions, and may also include discontinuity specifications. In the preferred embodiment, curves are computed so as to locally minimize a scale invariant functional of the geometry of the curve, such as a magnitude of variation in curvature of the curve (MVC) or a magnitude of curvature of the curve (MEC), while satisfying a user defined specification. An improvement on the MVC functional is to add a magnitude of variation in torsion of the curve. An improvement on the MEC functional is to add a magnitude of torsion of the curve. Networks of curves are produced using similar techniques of computing a local minimum of a functional of the geometry of the curves comprising the network, such as a magnitude of variation in curvature of the curves (MVN) or a magnitude of curvature of the curves (MEN), while satisfying a user defined specification. An improvement on these methods is to make the MVN and MEN functionals scale invariant. Another improvement is to make the MVN and MEN functionals torsion dependent. Surfaces are produced using a technique of computing a locally minimized functional of a magnitude of variation in curvature of the surface (MVS), while satisfying a set of surface constraints. An improvement on this method is to make the MVS functional scale invariant.

101 Claims, 19 Drawing Sheets

$$\kappa = \frac{1}{\|\text{RADIUS OF CURVATURE}\|}$$

| Vertex ID | $\hat{P}$ | Approximate Radius of Curvature | Approximate Normal Curvature | Least Squares Fit Normal Curvature |
|---|---|---|---|---|
| B | {1.0, 0.4, 1.0} | 2.7 | 0.370 | -0.0584 |
| C | {-1.0, -0.5, -2.0} | -5.25 | -0.190 | 0.452 |
| D | {0.0, 0.2, 0.5} | 0.725 | 1.379 | 0.929 |
| E | {-2.0, -0.75, 1.0} | -3.70833 | -0.269 | -0.162 |
| F | {0.0, 0.5, -1.0} | 1.25 | 0.8 | 0.928 |

METHOD FOR DESIGNING CURVED SHAPES FOR USE BY A COMPUTER

FIELD OF THE INVENTION

The present invention pertains to the field of geometric design techniques for computers. More particularly, this invention relates to novel methods for designing curves, networks of curves, and curved surfaces for use by a computer to perform an analysis or to subsequently display or to tool a curved object.

BRIEF DESCRIPTION OF THE PRIOR ART

Computer aided geometric design techniques are used to design curved shapes, such as curves and surfaces, where a physical model does not necessarily exist. These techniques typically involve providing a mechanism by which a designer specifies a shape using mathematical expressions directly corresponding to the shape. Such mathematical expressions are expressed by coefficients that are sometimes, but not always, related to the shape that they represent. Shapes are typically represented in a piecewise fashion by a composition of primitive elements that are smoothly joined together to form a larger, more complex whole.

Traditionally, methods for designing curved shapes focus on achieving a specific level of inter-element smoothness, or continuity. These methods use a combination of heuristics and constructions to achieve an ultimate shape. While these traditional methods do produce shapes that are continuous, these shapes are often of poor quality (referred to as lacking "fairness"). Shapes which lack fairness often possess undesirable blemishes, such as bulges and undulations. While less fair designs are useful, they are not suitable for many applications of curved shape design, such as automobile, ship and aircraft design where the quality of the shape produced by the method used is of paramount importance.

Given that the fairness of a shape is often important, various attempts have been made over the years to quantify fairness, even though the inherent subjectivity of assessing the appearance of a curved shape makes any definition of fairness rather difficult. Most quantitative measures of fairness are stated in terms of curvature, and sometimes torsion, since a curve's shape can be described by the curve's curvature and torsion as they vary along its length. In other words, the fairness of curves has generally been judged based on how little and how smoothly a curve bends. Traditional methods of curved shape design have therefore focused on the use of the minimum energy curve (MEC), which is a nonlinear curve modeling a thin beam that is characterized as bending the least while passing through a given set of points. The MEC functional, which is expressed as $$\int \kappa^2 ds.$$

minimizes the arc length integral of curvature squared.

Usage of the MEC functional for fair curve design (or one of its variations, the MEN for fair network design) has a few drawbacks. First, it does not readily form circular or helical shapes without requiring the imposition of arc length constraints. Second, it is not stable in all configurations and does not always produce a solution. For example, if the angular difference between tangents at adjacent vertices becomes greater than $\pi$, then the curve bulges out, growing to infinity.

It is also known in the art to utilize the MVC functional (minimum variation curve) for fair curve design and the MVN functional for fair network design. As so far utilized in the prior art however, both MVC and MVN functionals exhibit instability. The prior art has not solved the problem of applying a minimum variation-based functional to surfaces. In addition, no application of these known functionals has included factors taking torsion into account. When modeling space curves, torsion is non-zero and represents an important factor.

SUMMARY OF THE INVENTION

One objective of the present invention is to provide methods for designing smooth curves, networks of smooth curves, and smoothly curved surfaces of very high quality.

Another objective of the present invention is to provide a method for the design of both arbitrary (free-form) smooth curves and regular curves, specifically circular and helical arcs.

Another objective of the present invention is to provide a method for the design of both arbitrary (free-form) smoothly curved surfaces and regular surfaces, specifically portions of planes, spheres, cylinders, cones, tori and general cyclides.

Another objective of the present invention is to provide a method for the design of smooth curves that produces the same curve, network or surface independent of how the curve, network or surface is represented on the computer.

Another objective of the present invention is to provide methods for the design of smooth curves, networks of smooth curves, or smoothly curved surfaces that do not restrict the type (topological) of curve, network or curved surface that may be modeled.

Another objective of the present invention is to provide a method for the design of smooth curves that are specified only by the geometries of a curve, specifically, the points, tangent directions, and curvatures through which a curve must pass.

Another objective of the present invention is to provide a method for the design of a network of smooth curves that are specified only by the geometries of a smooth surface, specifically, the points, tangent plane, tangent directions, and surface curvatures through which the network must pass.

Another objective of the present invention is to provide a method for the design of smoothly curved surfaces that are specified only by the geometries of the smooth surface, specifically, the points, tangent plane, surface curvatures, and curves through which the surface must pass.

Another objective of the present invention is to provide a method for the design of curved shapes that is stable and produces shapes for all specifications.

Another objective of the present invention is to provide numerical measures of the quality of a smooth curve, a smooth network of curves, and a smoothly curved surface.

Another objective of the present invention is to provide numerical measures of the quality of a curve, a network of curves, or a smoothly curved surface that does not change value as the size of the curve, network, or surface is changed.

Another objective of the present invention is to provide a technique for the design of smooth curves with specific discontinuities of tangent direction or curvature.

Another objective of the present invention is to provide a technique for the design of networks of smooth curves with specific discontinuities of tangent plane or surface curvature.

Another objective of the present invention is to provide a technique for the design of smoothly curved surfaces with specific discontinuities of tangent plane or surface curvature.

Another objective of the present invention is to provide techniques for the design of smooth curves, smooth networks of curves and smoothly curved surfaces that exhibit consistency in that if the specification of a curve, network, or surface is augmented with a constraint that the curve, network or surface already satisfies, the shape of the curve, network or surface does not change.

These and other objects of the present invention are provided for by various methods for forming computer models of curves, networks, or surfaces from user defined specifications of the shape to be modeled are disclosed. Each specification includes a set of geometric constraints, such as positions, tangents curvatures, and torsions, and may also include discontinuity specifications. In the preferred embodiment, curves are computed so as to locally minimize a scale invariant functional of the geometry of the curve, such as a magnitude of variation in curvature of the curve (MVC) or a magnitude of curvature of the curve (MEC), while satisfying a user defined specification. An improvement on the MVC functional is to add a magnitude of variation in torsion of the curve. An improvement on the MEC functional is to add a magnitude of torsion of the curve. Networks of curves are produced using similar techniques of computing a local minimum of a functional of the geometry of the curves comprising the network, such as a magnitude of variation in curvature of the curves (MVN) or a magnitude of curvature of the curves (MEN), while satisfying a user defined specification. An improvement on these methods is to make the MVN and MEN functionals scale invariant. Another improvement is to make the MVN and MEN functionals torsion dependent. Surfaces are produced using a technique of computing a locally minimized functional of a magnitude of variation in curvature of the surface (MVS), while satisfying a set of surface constraints. An improvement on this method is to make the MVS functional scale invariant.

Other objects, features, and advantages of the present invention will be apparent from the accompanying drawings and from the detailed description which follows below.

DETAILED DESCRIPTION OF THE INVENTION AND PREFERRED EMBODIMENT

Figure 6:
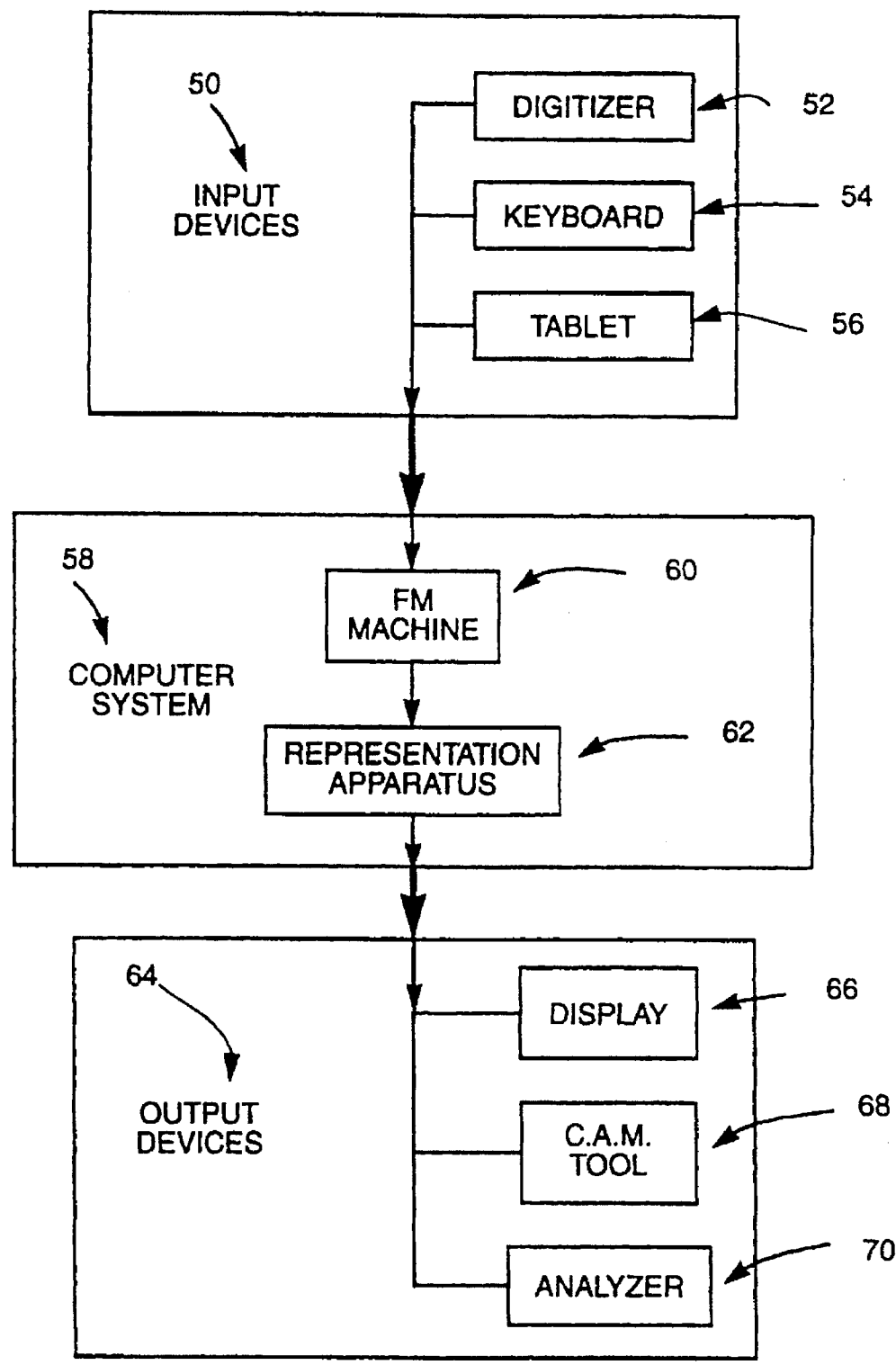
FIG. 6 is a block diagram illustrating a computer system for utilizing the methods of the present invention.

The present invention relates to geometric design techniques for computers. While the present invention is applicable for use on a wide variety of computer systems, it is particularly useful with computer systems that function to provide displays of two-dimensional and three-dimensional objects, provide specifications to computer-aided design tools, or perform other analytical functions. FIG. 6 illustrates a basic system which would operate and benefit from the methods of the present invention.

Before describing FIG. 6 in detail, however, a description of some of the basic terms relating to the present invention should prove to be useful. A curve is defined as a one dimensional path in two or three dimensional space. An open curve has a definite beginning and ending demarcated by points, whereas a closed curve is a loop without a beginning or an end. Technically, a smooth curve has a specified number of continuous arc length derivatives. A network of curves is defined as a collection of open curves joined together at shared end points. A surface is defined as a two dimensional region in three dimensional space. Where an open curve is bounded by end points, an open surface is bounded by curves. A closed surface has no boundaries. Further, there are geometric enties associated with curves and surfaces.

Figure 1:
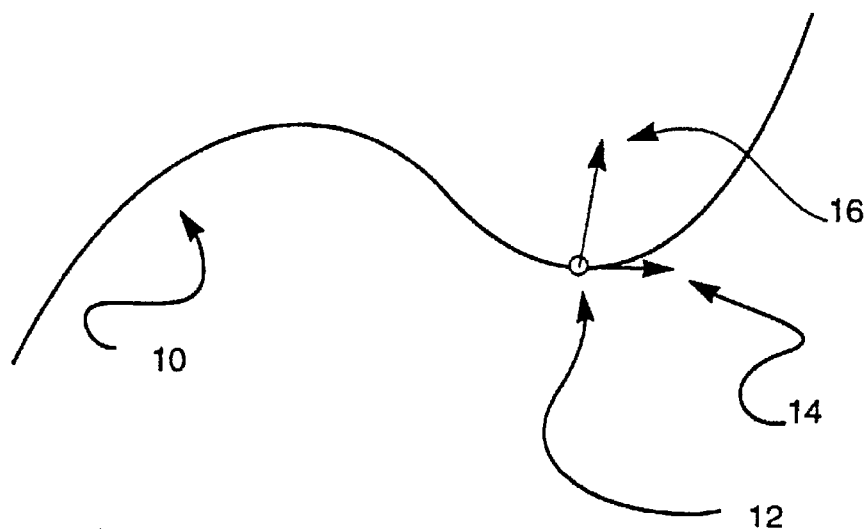
FIG. 1 is an illustration of the components of a curve.
Figure 2:
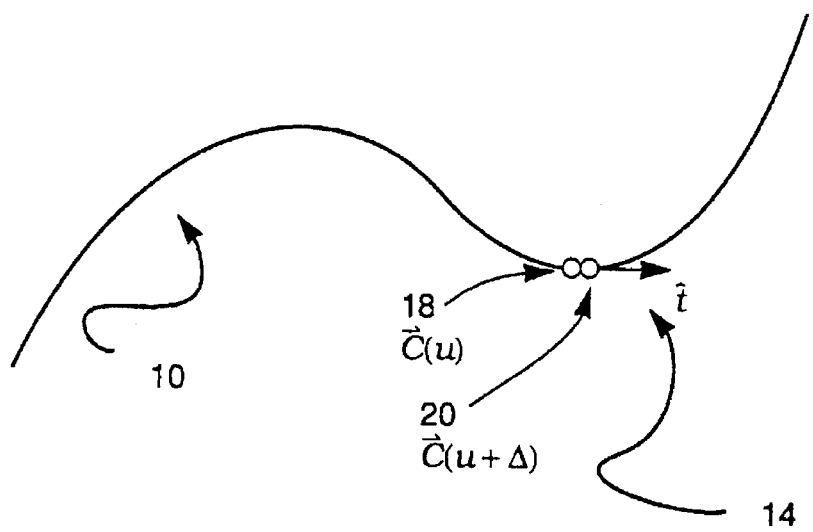
FIG. 2 is an illustration of a tangent vector.
Figure 3:
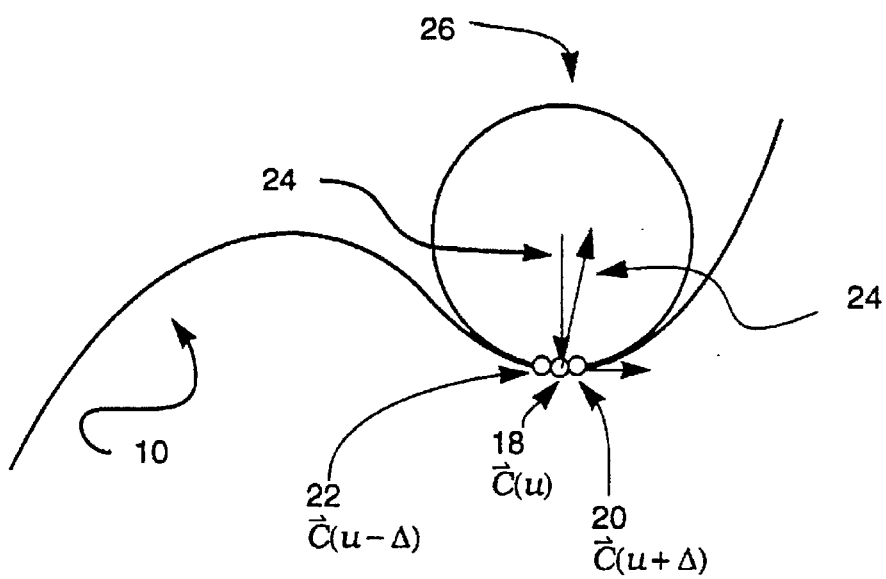
FIG. 3 is an illustration of a curvature vector.

With reference now to FIG. 1, the quantities used to describe the nature of a planar curve are illustrated. The quantities used to describe the curve 10 include the point 12, the tangent direction 14, and the curvature vector 16. A space curve would also include the scalar value torsion, which measures the degree to which the curve is non-planar. Tangents are further explained in FIG. 2 where the tangent 14 is defined as the direction in the limit of the line passing through two points at locations $\bar{c}(u)$ 18 and $\bar{c}(u+\Delta)$ 20 as $\Delta \to 0$. Curvature vectors are like described in FIG. 3, where the curvature vector 16 is perpendicular to the osculating plane which is the plane defined in the limit by three points at locations $\bar{c}(u)$ 18, $\bar{c}(u+\Delta)$ 20 and $\bar{c}(u-\Delta)$ 22 as $\Delta \to 0$, and has a magnitude equal to the reciprocol in the limit of the radius of curvature 24 of the osculating circle 26 defined by the same set of three points. The curvature may also be determined by computing the limit of the quotient of the angle between adjacent tangents and their separation on the curve;

$$\frac{\angle(\hat{t}(u), \hat{t}(u+\Delta))}{\Delta}$$

as $\Delta \to 0$. Similarly, when dealing with space curves, torsion is a scalar value equal to the limit of the quotient of the angle formed between adjacent osculating planes defined by $\bar{c}(u)$, $\bar{c}(u+\Delta)$, and $\bar{c}(u-\Delta)$, and $\bar{c}(u)$, $\bar{c}(u+\Delta)$, and $\bar{c}(u+2\Delta)$, and $\Delta$, as $\Delta \to 0$.

Figure 4:
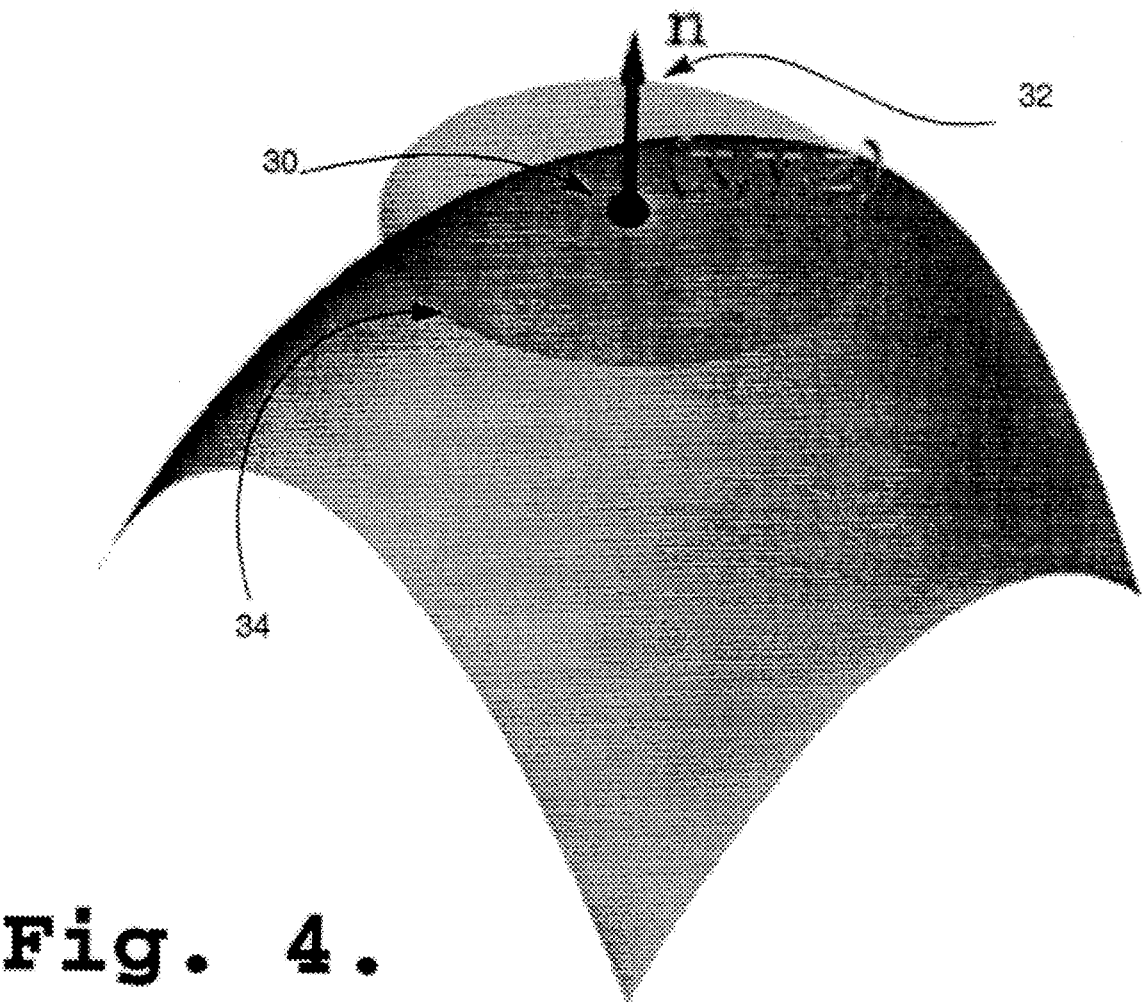
FIG. 4 is an illustration of a surface normal and tangent plane.
Figure 5:
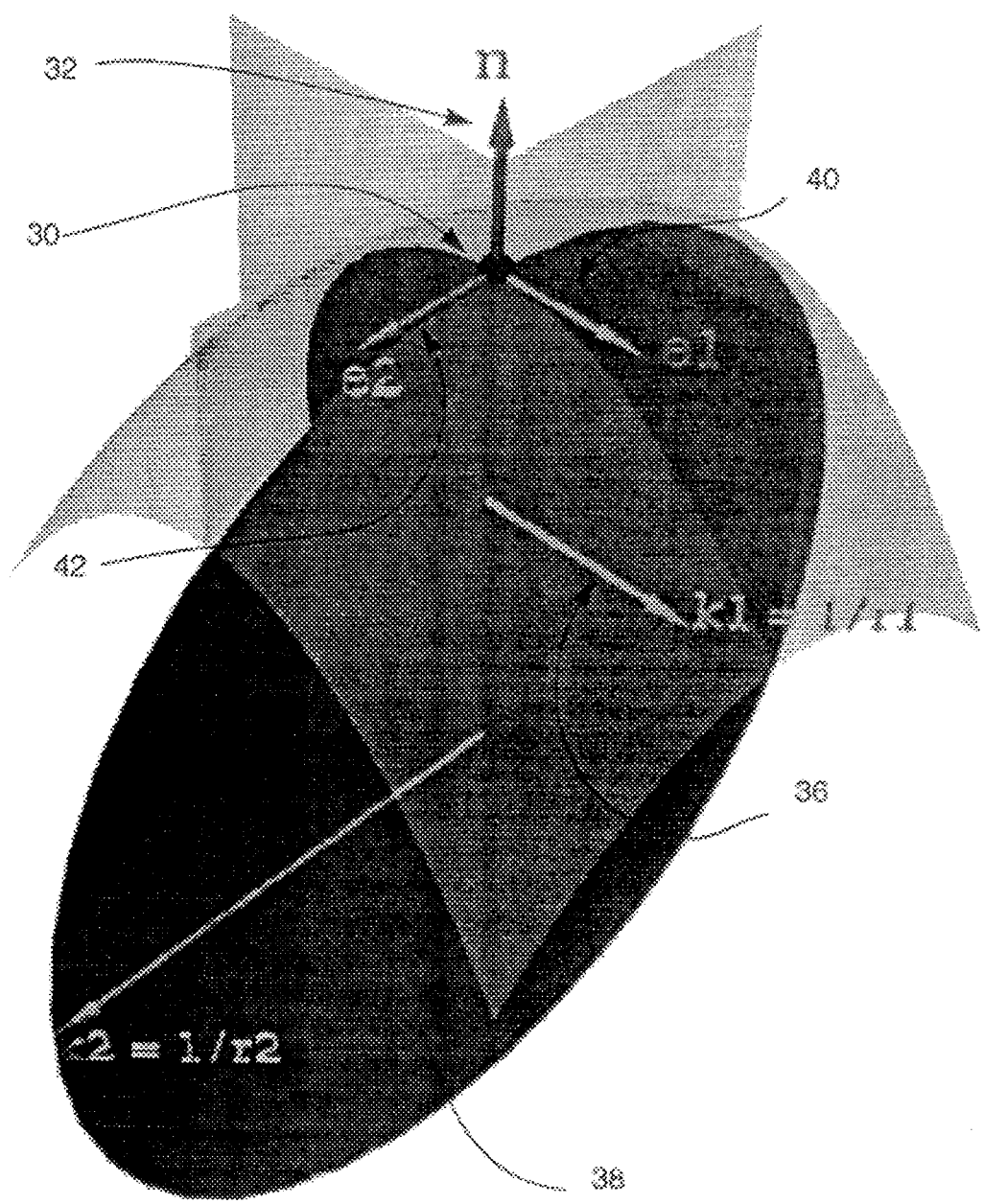
FIG. 5 is an illustration of principle curvatures.

When considering surfaces, there is a similar set of geometric entities that describe the nature of a surface at a point. In FIGS. 4 and 5 these are the point itself 30, the surface normal 32 or, equivalently, the tangent plane 34, and the maximum $\kappa_1$, 36, and minimum $\kappa_2$, 38, normal curvatures, referred to as the principle curvatures, and the tangent directions in which these maximum 36 and minimum 38 curvatures occur, referred to as the principle directions, tangent direction $\hat{e}_1$, 40 and tangent direction $\hat{e}_2$, 42 respectively. The normal curvature of a surface in a given surface tangent direction is computed by finding the curvature of the curve formed by the intersection of the plane spaned by the surface normal and the tangent direction and the surface itself. At a point on a surface, a continuous family of normal curvatures is formed by rotating the intersecting plane around the normal.

The present invention provides methods for designing curved shapes, such as curves, networks of curves, and curved surfaces, on a computer, whereby a shape specification, defined in terms of positions, tangent or normal directions, and curvatures, is transformed into a description of a smooth curve, a network of smoothly joined curves, or a smoothly curved surface, for subsequent analysis or output to a display or other device. In FIG. 6, the specification is input through an input device 50, such as a digitizer 52, keyboard 54, or tablet 56, which is in communication with the computer system 58. The computer system 58, in the preferred embodiment of the present invention, with respect to curved shape design, is generally comprised of an FM machine 60, where FM stands for functional minimization, and a representation apparatus 62. The computer system 58 is in turn connected to any of a number of different output devices 64, such as display 66, computer aided manufacturing (CAM) tool 68, or analyzer 70, for post processing of the desired curved shape.

The FM machine 60 serves a primary function of receiving the input specification of the desired shape and performing an appropriate functional minimization on the curved shape specification, the solution to which is output to the representation apparatus 62. The representation apparatus 62 receives the minimized function and produces a representation of the desired shape, which is based on the selected functional and the specification. Although it is generally contemplated that the operations performed by both the FM machine 60 and the representation apparatus 62 would be formed by various standard hardware and software components of an off-the-shelf computer system 58, a specialized hardware based machine could be readily constructed utilizing well know techniques to perform any of the herein described methods.

With respect to the present invention, curves are specified by a a set of geometric constraints that are provided in a specified sequence. At a minimum, these geometric constraints include at least one point that the desired curve must interpolate, but additional constraints can also be specified. These additional constraints, which are likewise interpolated in their specified sequence, include tangents, curvatures, torsions, and/or discontinuities. FIGS. 7a–d illustrate the effect of positional, tangential, and curvature constraint types as applied to a minimum variation curve (MVC) functional, as further described below, and show that curvature discontinuities may also be specified.

Figure 7:
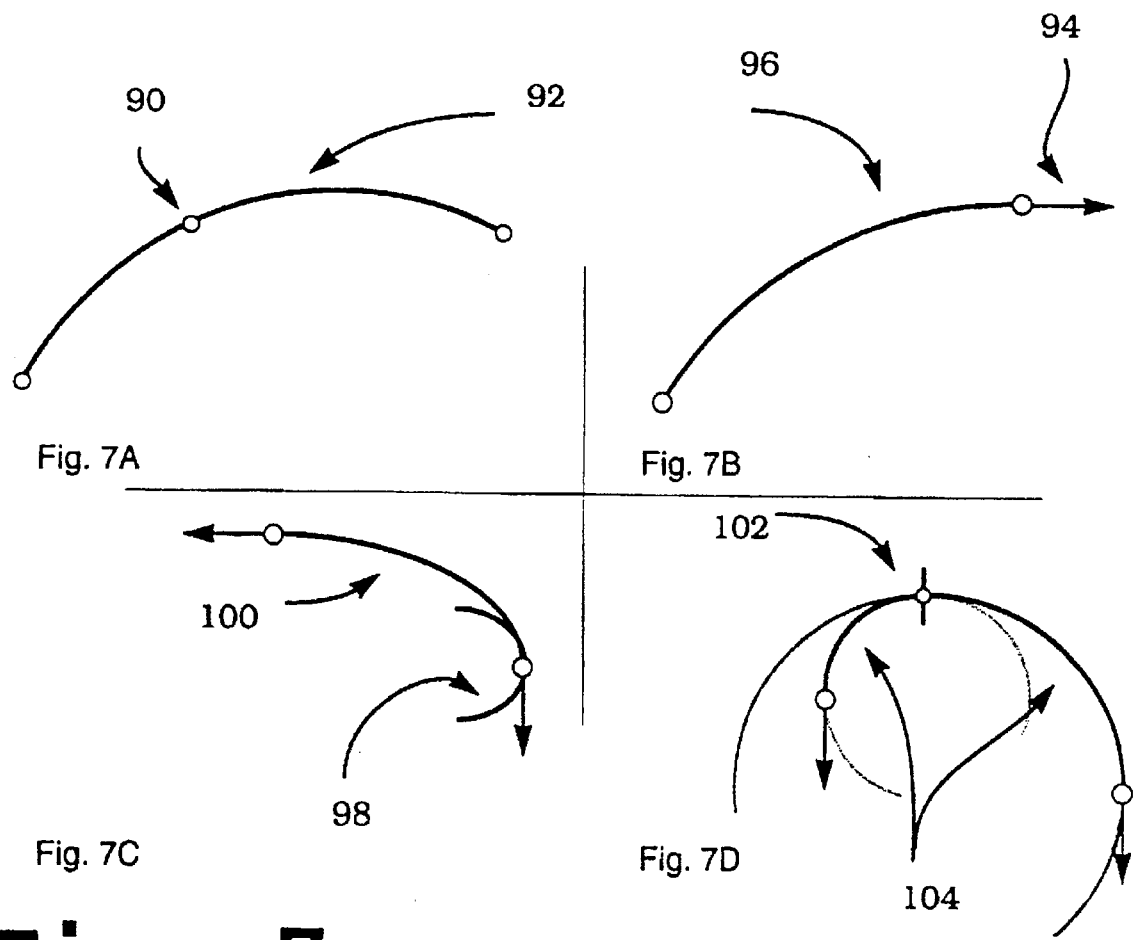
FIGS. 7a–7d illustrate different contraints which may be specified for a curve.

In FIG. 7a, three point constraints, such as point 90, are specified so as to form a circular arc 92. In FIG. 7b, a tangent constraint, such as tangent constraint 94, is specified in combination with two point constraints to specify the curve 96. In FIG. 7c, to provide further control over the curve shape to be created, a curvature constraint, such as curvature constraint 98, is specified along with two point constraints and a tangent constraint to form the curve 100. Finally, In FIG. 7d, a curvature discontinuity, such as curvature discontinuity 102, is specified, thereby allowing circular curve segments 104 to be formed.

In designing the MVC functional utilized in the present invention, our choice of functional for minimization was based on the need for high quality curves and intuitive interactive behavior. As previously described, the quality or fairness of curves has been studied extensively and previously shown to be closely related to how little and how smoothly a curve bends. While the cubic spline is a linear approximation to an idealized thin beam at minimum strain energy passing through a series of frictionless, swiveling supports, the nonlinear curve modeling a thin beam is known as the minimum energy curve or MEC. As previously described, the MEC is characterized by bending the least while passing through a given set of points.

Figure 8A:
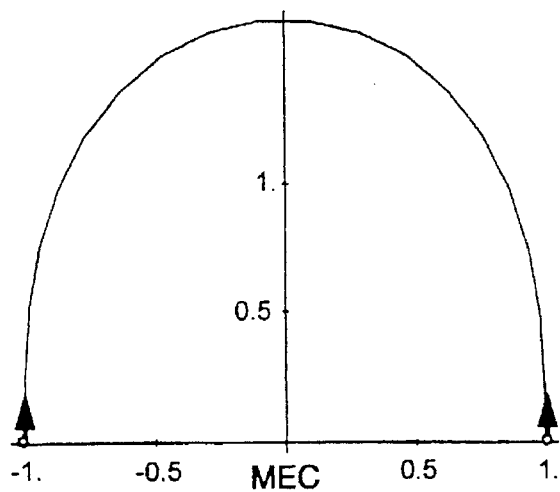
FIGS. 8a and 8b illustrate curves produced utilizing MEC and MVC functionals, respectively.

FIG. 8a provides an example of the type of shape formed by an MEC functional for a simple set of constraints. Again, use of the MEC functional has a few drawbacks in that it does not readily form circular or helical shapes without imposition of arc length constraints, and that it is not stable in all configurations. In contrast to the MEC, which bends as little as possible, the minimum variation curve (MVC) bends as uniformly or as smoothly as possible while passing through a series of points. The uniformity of bending is measured by the magnitude of the rate of change of curvature, minimizing the functional $$\int \left(\frac{d\bar{\kappa}}{ds}\right)^2 ds.$$

Figure 8B:
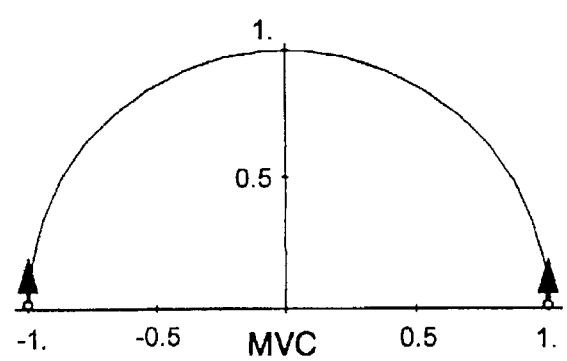

FIG. 8b illustrates the type of shape formed by an MVC functional for the same set of constaints used in FIG. 8a. Note that the MVC forms a circular arc in response to these symmetric constraints. In addition, the MVC is more stable, changing shape continuously with continuous changes in constraints. The MVC also has the property that it forms circular arcs when constraints allow.

In the context of the present invention some modifications to the MVC and MEC functionals improve these functionals performance when applying these functionals to space curves. When formulating a functional for modeling space curves (non-planar curves), torsion becomes a factor. In the context of the traditional MEC functional based on strain energy, a torsion term must be added to the functional to account for twisting, $$\int \kappa^2 + \tau^2 ds.$$

Analogously, the space MVC functional becomes $$\int \left(\frac{d\kappa}{ds}\right)^2 + \left(\frac{d\tau}{ds}\right)^2 ds.$$

Note that in contrast to the MVC functional, the space MVC functional is composed of the scalar-valued derivatives of curvature ($\kappa$) and torsion ($\tau$). The result is a functional that evaluates to zero for helices, which of course include circles. While the MVC functional produces curves with zero torsion at their end points, the space MVC functional produces curves with constant torsion at their end points.

An MVC is invariant under rigid body transformations and uniform scaling. The value of the MVC functional, however, changes with a change of scale. Thus, as the scale increases by a factor of $\gamma$, the functional value is reduced by a factor of $1/\gamma^3$. The MEC functional has a similar sensitivity to scaling, but in its case, the reduction is by a factor of $1/\gamma$. The present invention resolves these sensitivities by modifying the functionals to create functionals whose values are independent of scale. With respect to the MVC functional it is important that this new functional preserves the desirable properties of the MVC functional; its characteristic shapes, parameterization independence, and representation independence. By adding terms which are composed solely of geometric measures the present invention guarantees parameterization and representation independence. To insure that the scale invariant MVC (SI-MVC) functional has the same characteristic shapes, it is necessary to guarantee that if the standard MVC functional evaluates to zero, that the SI-MVC functional must evaluates to zero. Taking these factors into consideration, the design of a functional for utilization in the methods of the present invention incorporates an arc length term to offset the scaling factor, $$\left(\int ds\right)^3 \int \left(\frac{d\vec{\kappa}}{ds}\right)^2 ds;$$

the space MVC is similarly transformed, $$\left(\int ds\right)^3 \int \left(\left(\frac{d\kappa}{ds}\right)^2 + \left(\frac{d\tau}{ds}\right)^2\right) ds$$

Similarly, the MEC and space MEC functionals are made scale invariant by multiplying by an arc length, $$(\int ds)\int \kappa^2 ds, (\int ds)\int (\kappa^2+\tau^2) ds.$$

Starting with this section, a method is described for the computation of a minimum variation curve, the curve that minimizes the MVC functional while satisfying a given set of constraints. While the present invention is particularly directed to the use of specific functionals, the computation of curves based on other functionals would follow analogous methods. The problem of computing a curve is cast herein as a nonlinear optimization/finite element problem. Curve representation plays an important role in making curves designed on a computer useful to applications of that computer. To this end, the curve is broken into a series of parametric polynomial elements that satisfy the given geometric constraints, and join with $G^1$ or $G^2$ continuity depending on the functional being minimized. Among polynomials, quintic elements are most suitable because they have sufficient descriptive power to simultaneously satisfy the constraints on position, tangent direction, and curvature. If torsion is also specified and/or minimized then heptic polynomial elements are necessary.

In the context of the present invention, the Hermite form is chosen because of the ease with which the geometric specifications can be mapped to the defining parameters of the Hermite segments. Also, this form is easily converted into other polynomial representations that are typically used in geometric modeling systems. Quintic Hermite curves are specified by the position of the endpoints and by the first two parametric derivatives at these locations. In vector notation this can be expressed as:

$$\vec{C}(u) = \begin{bmatrix} \vec{C}(0) \\ \vec{C}'(0) \\ \vec{C}''(0) \\ \vec{C}''(1) \\ \vec{C}'(1) \\ \vec{C}(1) \end{bmatrix}^T \cdot \begin{bmatrix} H_0(u) \\ H_1(u) \\ H_2(u) \\ H_3(u) \\ H_4(u) \\ H_5(u) \end{bmatrix} =$$

$$\vec{C}(0)H_0(u) + \vec{C}'(0)H_1(u) + \ldots + \vec{C}(1)H_5(u)$$

where $H_i(u)$ are quintic blending functions. The computation of $H_i(u)$ is well known in the art. Heptic Hermite curves are specified similarly by the position of the endpoints and the first three parametric derivatives at these locations. The mapping from the geometric to parametric description of the curve is carried out using the following equations $$\vec{P}_i = \vec{p}_i$$
$$\vec{P}'_i = m_i \hat{t}_i$$
$$\vec{P}''_i = m_i^2 \vec{\kappa}_i + \alpha_i m_i \hat{t}_i$$
$$\vec{P}'''_i = (\hat{t}_i \times \vec{\kappa}_i)\tau_i m_i^3 + \beta_i \hat{t}_i + \gamma_i \vec{\kappa}_i$$

where $\vec{p}_i$, $\hat{t}_i$, $\vec{\kappa}_i$, $\tau_i$ are the respective position, tangent direction, curvature vector, and torsion at one end of the curve, $m_i$ is the first derivative magnitude, $\alpha_i$ completes the relationship between curvature and the second derivative. Finally, $\beta_i$ and $\gamma_i$ define the relationship between torsion and the third derivative. During the minimization, the scalar $m_i$ must be constrained to be positive because if $m_i$ were allowed to become negative, then $P'_i$ would reverse direction. This constraint is imposed by using $m_i^2$ rather than $m_i$ in the above equations:

$$\vec{P}_i = \vec{p}_i$$
$$\vec{P}'_i = m_i^2 \hat{t}_i$$
$$\vec{P}''_i = m_i^4 \vec{\kappa}_i + \alpha_i m_i^2 \hat{t}_i$$
$$\vec{P}'''_i = (\hat{t}_i \times \vec{\kappa}_i)\tau_i m_i^6 + \beta_i \hat{t}_i + \gamma_i \vec{\kappa}_i \quad (1)$$

Figure 9:
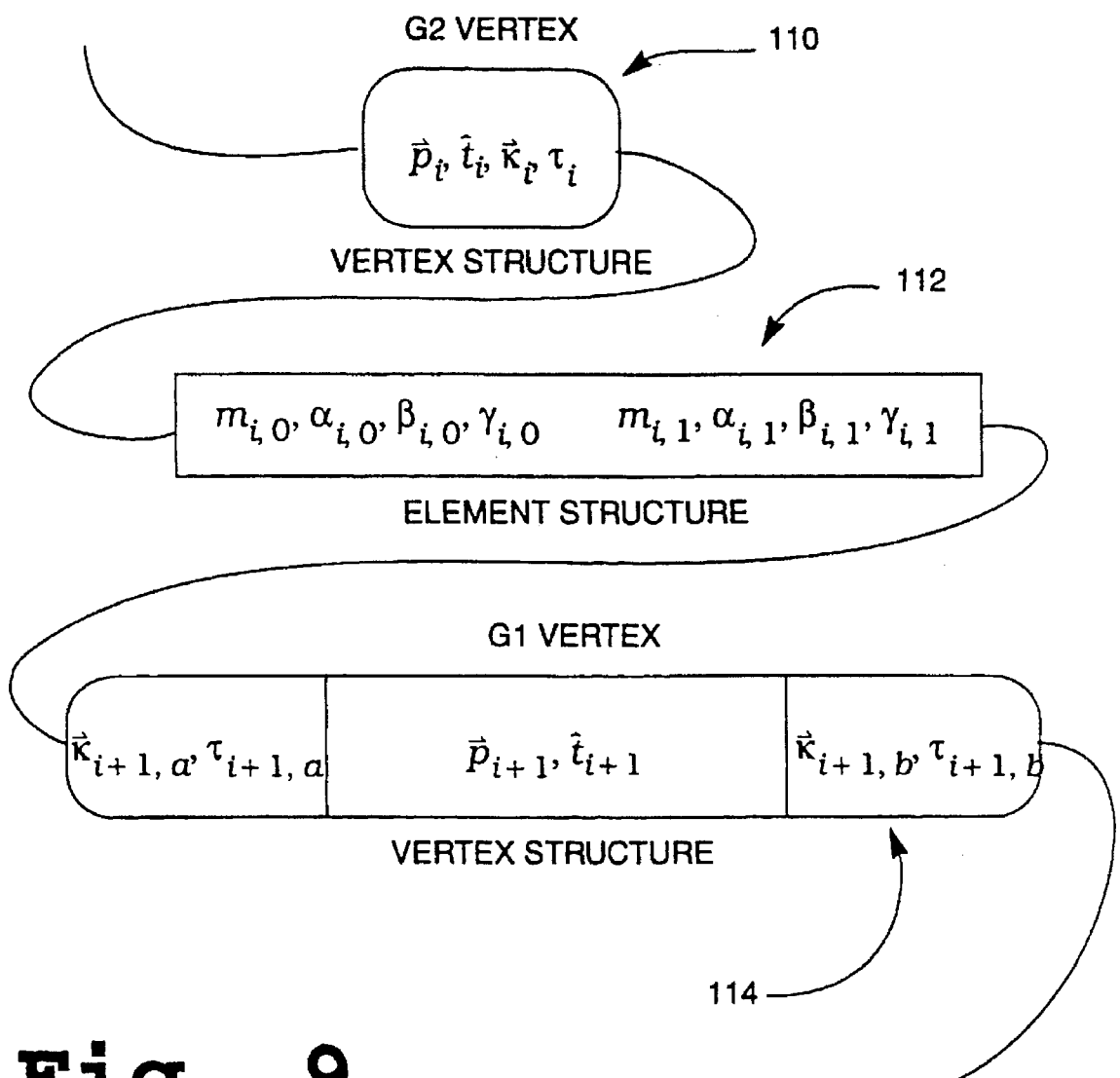
FIG. 9 is a schematic diagram of data structures.

As illustrated in FIG. 9, a curve is made up of a sequence of vertices connected by quintic elements. $G^1$ or $G^2$ curves are pieced together from these elements by sharing geometric specifications at the common points. Data structures associated with the vertices hold the point, tangent, and curvature information, while data structures associated with the elements hold the parameters $\alpha_{i,0}$, $\alpha_{i,1}$, $m_{i,0}$, $m_{i,1}$, $\beta_{i,0}$, $\beta_{i,1}$, and $\gamma_{i,0}$, $\gamma_{i,1}$. In FIG. 9 each element is defined by three data structures, a pair of vertex structures 110 and 114, associated with the vertices at the element's endpoints, and one element structure 112, associated with the element itself. By distributing the curve/element specification in this way, adjacent elements share vertex structures and are guaranteed to meet with the required continuity: tangent, curvature, and/or torsion continuity. Note that discontinuities can be introduced by giving adjacent elements independent geometric specifications such as illustrated by element structure 112.

As has thus far been described, a single quintic Hermite segment or element is placed between every two sets of constraints. Because of the limited descriptive power of polynomial elements, a single element can only approximate the ideal minimum variation curve. To improve the approximation, multiple elements can be inserted between constraints. In practice, a single element per constraint pair is normally sufficient. Depending on the goal of the application, it may not be important that the theoretical curve is accurately approximated, only that its desirable curvature properties be present.

The functionals thus far discussed are defined in terms of an integral of a function over arc length. To evaluate these functionals and their gradients in the context of the parametric piece-wise polynomial curves described above, the functionals must be converted to a parametric polynomial form and evaluated in a piecewise fashion. As an example the conversion of the MVC functional will now be described.

The value of the functional for the curve as a whole is computed as the sum of the values of the functional for each element. In the first conversion step, the arc length based definition $$\int_0^l \frac{d\vec{\kappa}^2}{ds} ds$$

is changed to an integral of a function of the curve $\vec{c}(t)$ parameterized by t of the form $$\int_\alpha^\beta f(\vec{C}(t)) dt.$$

The bounds, $\alpha$ and $\beta$, of the integral are set to 0 and 1, since the Hermite representation is parameterized with t varying from 0 to 1. The differential with respect to s is converted to a differential in t. Since $$\frac{dt}{ds} = \frac{1}{\|\vec{C}'(t)\|} \text{ then } ds = \|\vec{C}'(t)\| dt$$

where $$\|\vec{C}'(t)\| = (\vec{C}'(t) \cdot \vec{C}'(t))^{1/2}.$$

Next, the derivative of curvature with respect to the arc length $$\frac{d\vec{\kappa}}{ds}$$

transforms to:

$$\frac{d\vec{\kappa}}{dt} \frac{dt}{ds}.$$

These two steps yield:

$$\int_0^l \frac{d\vec{\kappa}^2}{ds} ds = \int_0^l \left( \frac{d\kappa}{dt} \frac{dt}{ds} \right)^2 \|\vec{C}'(t)\| dt$$

-continued $$\int_0^l \frac{d\vec{\kappa}^2}{ds} ds = \int_0^l \frac{d\vec{\kappa}^2}{dt} \frac{1}{\|\vec{C}'(t)\|} dt.$$

Lastly the expression for $$\frac{d\vec{\kappa}}{dt}$$

is found in terms of the parametric derivatives of the curve, $\vec{c}(t)$. Since the expression for curvature is $$\vec{\kappa}(t) = \frac{\vec{C}'(t) \times \vec{C}''(t)}{\|\vec{C}'(t)\|^3},$$

taking the derivative with respect to t yields $$\frac{d\kappa}{dt} = \frac{vdu - udv}{v^2}$$

where $$u = \vec{C}'(t) \times \vec{C}''(t), \quad du = \vec{C}'(t) \times \vec{C}'''(t),$$

$$n.b. \ \vec{C}''(t) \times \vec{C}''(t) = 0, \text{ and}$$

$$v = \|\vec{C}'(t)\|^3 = (\vec{C}'(t) \cdot \vec{C}'(t))^{3/2} \text{ and}$$

$$dv = 3\|\vec{C}'(t)\|(\vec{C}'(t) \cdot \vec{C}''(t)).$$

The optimization process requires that the partial derivatives of the functional be computed. Since the derivative of an integral is equal to the integral of the derivative, is is also necessary to compute the partial derivatives of the integrand of the MVC functional.

During the optimization process, the values of the MVC functional and its partial derivatives, with respect to the free parameters, are computed. Since the value of the MVC integral cannot be computed in closed form, the function is sampled over a domain to approximate the integral;

$$\sum_i w_i f(t_i), t_i \in [\alpha, \beta] \approx \int_\alpha^\beta f(t) dt$$

The well known Gauss-Legendre quadrature is used to compute the (curvature) integrals. This method converges quickly as the number of samples or integration points is increased.

Figure 10:
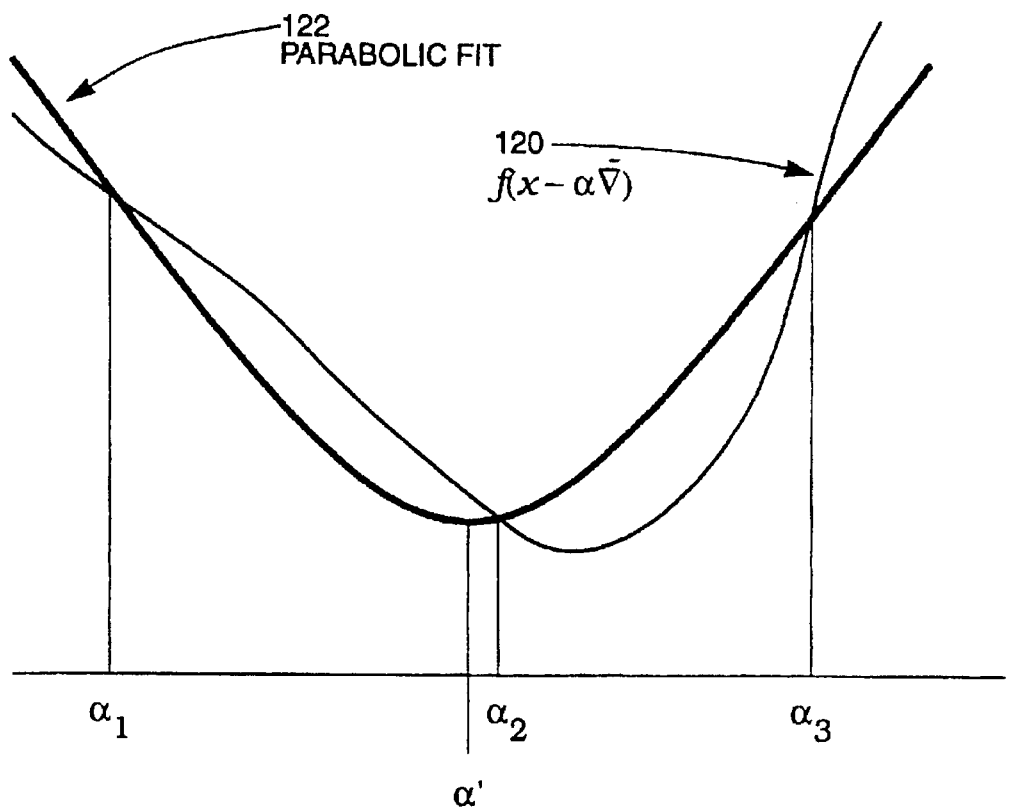
FIG. 10 is an illustration of a parabolic fit utilized for line minimization.

When cast as a multi-dimensional optimization problem, the curve is represented by a point in $\Re^n$, corresponding to its n degrees of freedom. The MVC functional undergoing minimization is expressed as $f(x)$, $x \in \Re^n$. Standard optimization techniques are used to minimize $f(x)$. Starting from a heuristically established point in $\Re^n$, the well known Polak-Ribiere conjugate gradient descent is used to traverse the space while reducing the objective function and ultimately arriving at a minimum. This descent method uses a weighted average of gradients from past iterations, $$\vec{V} = \Sigma \nabla f(x_i) w_i,$$

to determine a direction for movement $\vec{V}$. As illustrated in FIG. 10, once $\vec{V}$ is computed, a one-dimensional minimization is performed to find the minimum of $f(x-\alpha \vec{V})$, 120, over $\alpha$. First the line minimization brackets a minimum, finding three values of $\alpha$ such that $f(x-\alpha_2\vec{V})<f(x-\alpha_1\vec{V})$, $f(x-\alpha_2\vec{V})<f(x-\alpha_3\vec{V})$ and $\alpha_1<\alpha_2<\alpha_3$. Then it uses a parabolic fit 122 to calculate a new value of $\alpha$, and eliminates either $\alpha_1$ or $\alpha_3$ while maintaining the bracketing relationship. This second step is repeated until a minimum is reached when the $\alpha_i$ converge on each other, as illustrated in FIG. 10.

The descent scheme described above starts with an initial curve and iteratively refines that curve until the optimal curve is achieved. In this next section the problem of finding a suitable initial curve is discussed. In terms of optimization, the problem is to find an initial point in the "valley" of the functional where the minimum point (corresponding to the stable equilibrium of shortest length) lies at the bottom. The optimization requires that initial values be prodded for any parameters not explicitly set; $m_{i0}$, $m_{i1}$, $\alpha_{i0}$, $\alpha_{i1}$, $\beta_{i0}$, $\beta_{i1}$, $\gamma_{i0}$, $\gamma_{i1}$, $\hat{t}_i$, $\vec{\kappa}_i$, and $\tau_i$ as set forth in equation (1) and illustrated in FIG. 9. The rate of convergence of the minimization procedure depends strongly on the initial curve and, as a result, so does the speed with which solutions may be found.

Figure 11:
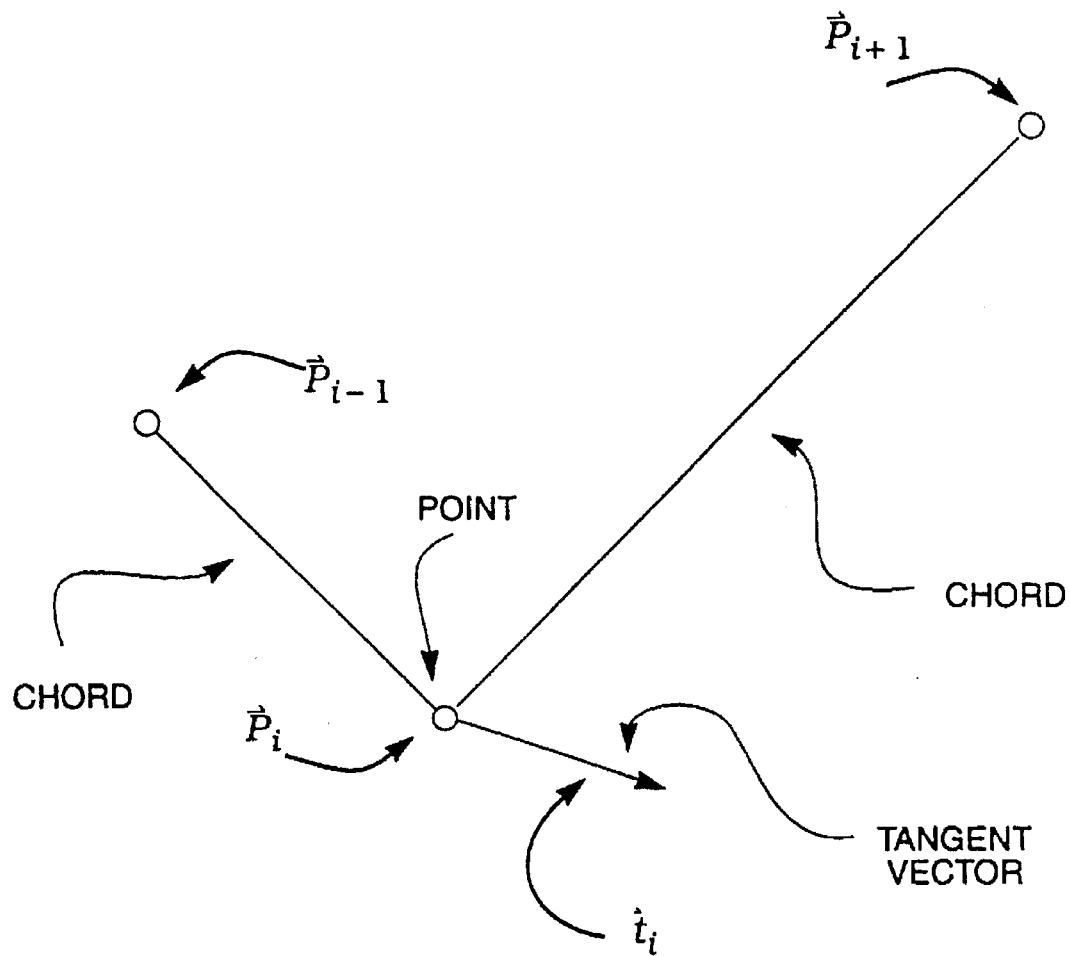
FIG. 11 is an illustration of the initialization of a tangent vector.

Based on an understanding of the nature of the MVC functional, an initial curve shape that is close to the solution is chosen. The values of $m_{i0}$ and $m_{i1}$ are related to the arc length of the curve and are initialized to the chord length $\|\vec{P}_i - \vec{P}_{i+1}\|$. The values of $\alpha_{i0}$, $\alpha_{i1}$, $\beta_{i0}$, $\beta_{i1}$, $\gamma_{i0}$, and $\gamma_{i1}$ specify the nature of the parameterization at the endpoints; setting them to 0 causes the curve to be arc length parameterized at its endpoints. The tangent directions are set to the average of the incident chord directions weighted inversely in proportion to their length, as illustrated in FIG. 11:

$$\vec{t} = \frac{\vec{P}_{i-1} - \vec{P}_i}{\|\vec{P}_{i-1} - \vec{P}_i\|^2} + \frac{\vec{P}_i - \vec{P}_{i+1}}{\|\vec{P}_i - \vec{P}_{i+1}\|^2} \quad \hat{t}_i = \frac{\vec{t}_i}{\|\vec{t}_i\|}.$$

Figure 12:
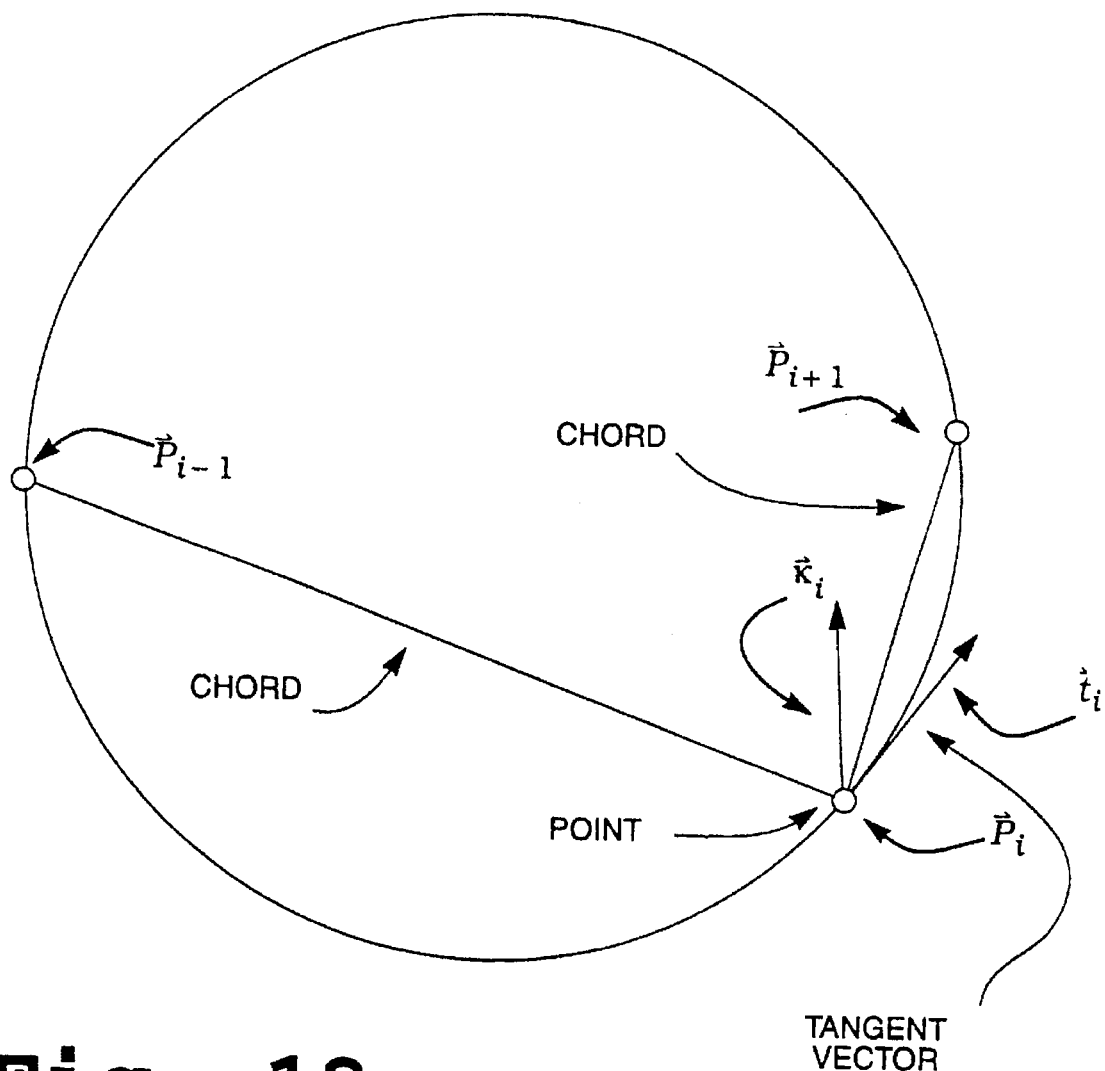
FIG. 12 is an illustration of the initialization of a curvature vector.

The magnitudes of the curvature vectors $\vec{\kappa}_i$ are set by computing the radius of the circle that interpolates the associated point and its two neighbors, as illustrated in FIG. 12. The direction of the curvature vector is perpendicular to the plane defined by the three points defining the circle.

Figure 13:
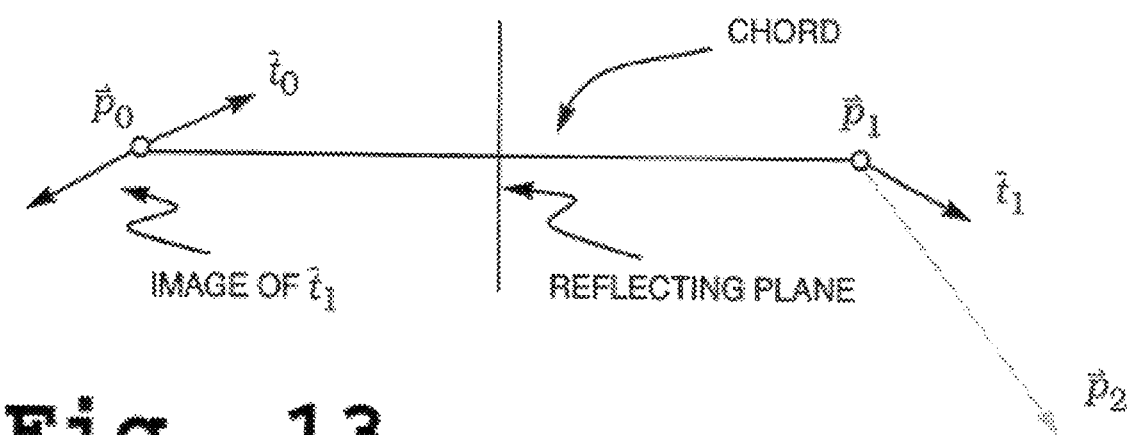
FIG. 13 is an illustration of the initialization of a tangent vector at the end point of a curve.

In the case where the curve is not closed, such as shown in FIG. 13, and the elements at the ends of the curve have endpoints that do not have two neighbors, the curvature is set equal to the curvature to which the single neighbor was initialized. The tangent direction is set to the tangent direction at the other endpoint reflected about the perpendicular plane through the midpoint of the intervening chord.

Having described the application of scale invariant MVC and MEC to curves, as well as torsion dependant MVC and MEC, it is now possible to more briefly describe the application of these same functionals to networks of curves. A minimum variation network (MVN) is constructed to exactly match second order geometric specifications at the vertices of the network. Minimally, a network may be specified by vertex positions. A network specification may also include surface normal and curvature information to be interpolated. Finally, it is possible to specify the tangent direction at the end points of individual curves in the network.

The network is constrained to meet at its vertices such that at each vertex a second order continuous surface containing the curves incident to the vertex can be constructed. The specification permits the assignment of a fixed or initial geometric characterization to each vertex of the network. Specifically, this geometric description consists of the vertex position, and optionally, tangent plane, and principal directions and principal curvatures. In addition to the geometric specification, a list of incident curves is also prodded. The curves making up the network are defined by pairs of vertices. It is also possible to fix and/or initialize the tangent directions associated with the end points of each curve.

Internal to the optimization, the network of curves is defined via the second order parameters of a surface description at each vertex of the network and via a description of how each curve segment emerges from within the osculating paraboloid specified at its endpoints. Each such paraboloid is defined by the vertex position $\vec{p}$, a pair of principle directions, $\hat{e}_1$, $\hat{e}_2$, and the corresponding principle curvatures in those directions $\kappa_{e1}$, $\kappa_{e2}$. The network is represented by quintic Hermite curves. These curves are defined by the positions and the first two parametric derivatives at their endpoints: $\vec{p}$, $\vec{p}'$, $\vec{p}''$. Each curve in the network is defined by the position $\vec{p}$, tangent direction $\hat{t}$, and three scalar parameters, m, $\alpha$, c, at each endpoint. The mapping from these values to the parameters defining the corresponding Hermite curve is $$\vec{P} = \vec{p} \quad \vec{P}' = m^2 \hat{t} \quad \vec{P}'' = m^4 \vec{\kappa} + \alpha m^2 \hat{t}$$
$$\vec{\kappa} = \kappa_n \hat{n} + c\hat{b} \quad \hat{b} = \hat{n} \times \hat{t}$$
$$\kappa_n = \kappa_1 (\hat{t} \cdot \hat{e}_1)^2 + \kappa_2 (\hat{t} \cdot \hat{e}_2)^2 \qquad (2)$$

Note that the curvature of the curve $\vec{\kappa}$ is the sum of two orthogonal components; the component in the normal direction $\kappa_n$ is a function of the surface curvature at the vertex and the tangent direction of the curve at its end point; and the component in the binormal direction c is independent of the surface curvature at the vertex and represents the curvature of the curve "within the surface."

During the optimization process, those variables not fixed by constraints are iteratively adjusted to minimize the MVN functional summed over all curves of the network. At each iteration step, $\hat{e}_1$ and $\hat{e}_2$ are renormalized, the unit normal is computed from $\hat{e}_1$ and $\hat{e}_2$, then $\hat{e}_2$ is set equal to the cross product of the unit normal and $\hat{e}_1$, and finally $\hat{t}_i$ is projected onto the plane spanned by $\hat{e}_1$, $\hat{e}_2$ and is also renormalized. It is this normalization step in combination with the construction outlined in equation (3) above that guarantees that $G^2$ continuity is maintained.

The curve network must be initialized to some reasonable shape before optimization can proceed. Because the starting point of an optimization strongly affects the rate of convergence, it is important that the starting point actually be near the optimal network. At each interpolation point, a vertex normal vector is first initialized, then the tangent vectors of the incident curves are computed, next the principal directions and curvatures are defined, and finally each curve's scalar coefficients are initialized. In order to initialize the second order parameters of the vertices, a new method has been developed for estimating the principal curvatures of a polyhedral structure.

Figure 14:
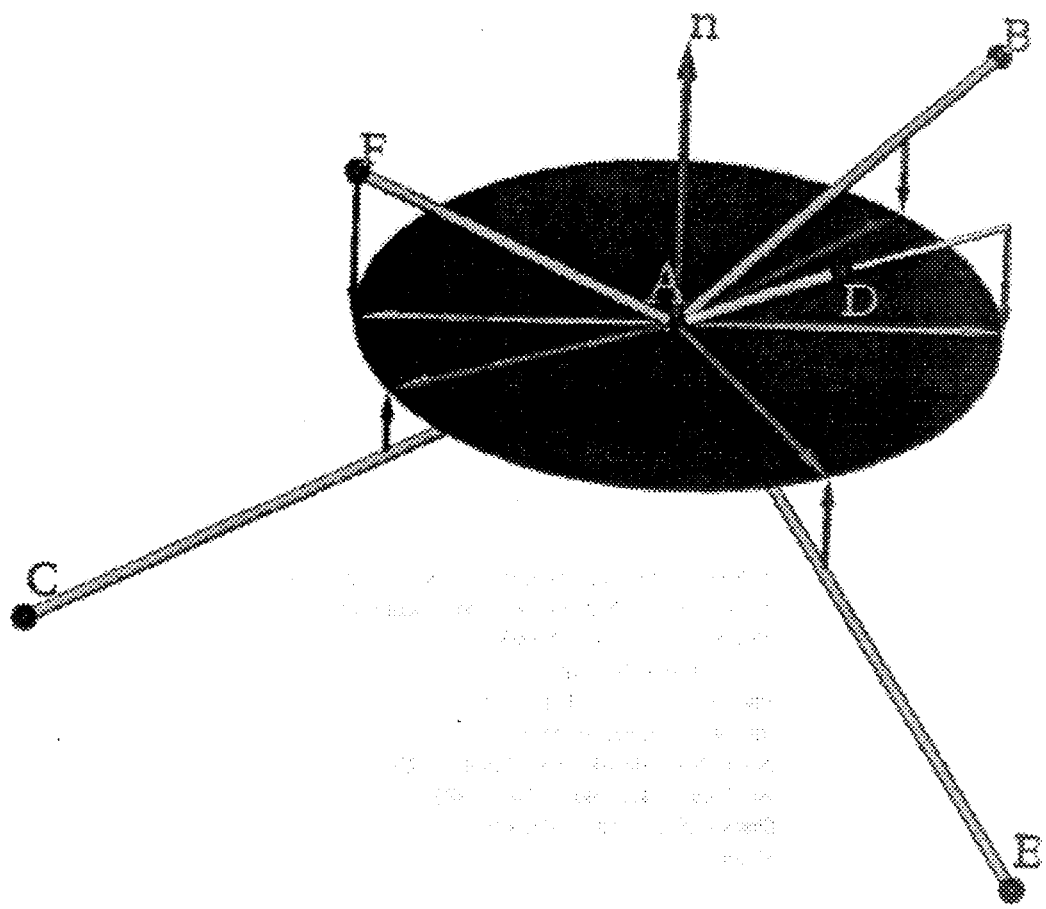
FIG. 14 is an illustration of the initialization of tangent vectors in a curve network.

In this new method, the vertex normal is initialized as an average of the incident face normals weighted inversely proportional to the area of the incident face, i.e. the smaller the face the greater its influence on the vertex normal. As illustrated, in FIG. 14, the tangent vectors of curves incident to a vertex are set to the direction of the incident chords projected onto the plane defined by the vertex position $\vec{p}_i$ and the normal $\hat{n}$.

Figure 15:
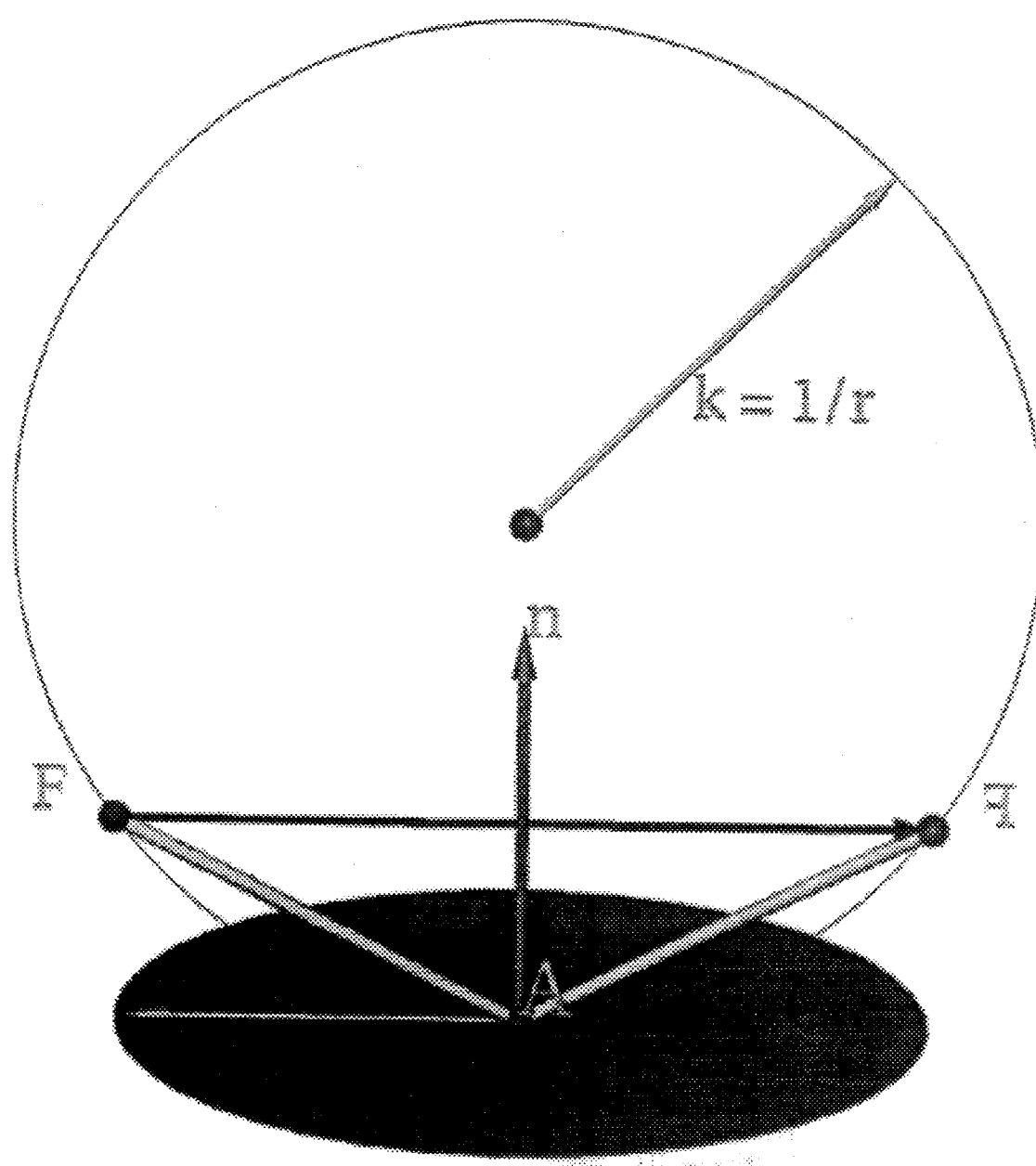
FIG. 15 is an illustration of the approximate radius of curvature.
Figures 16, 17:
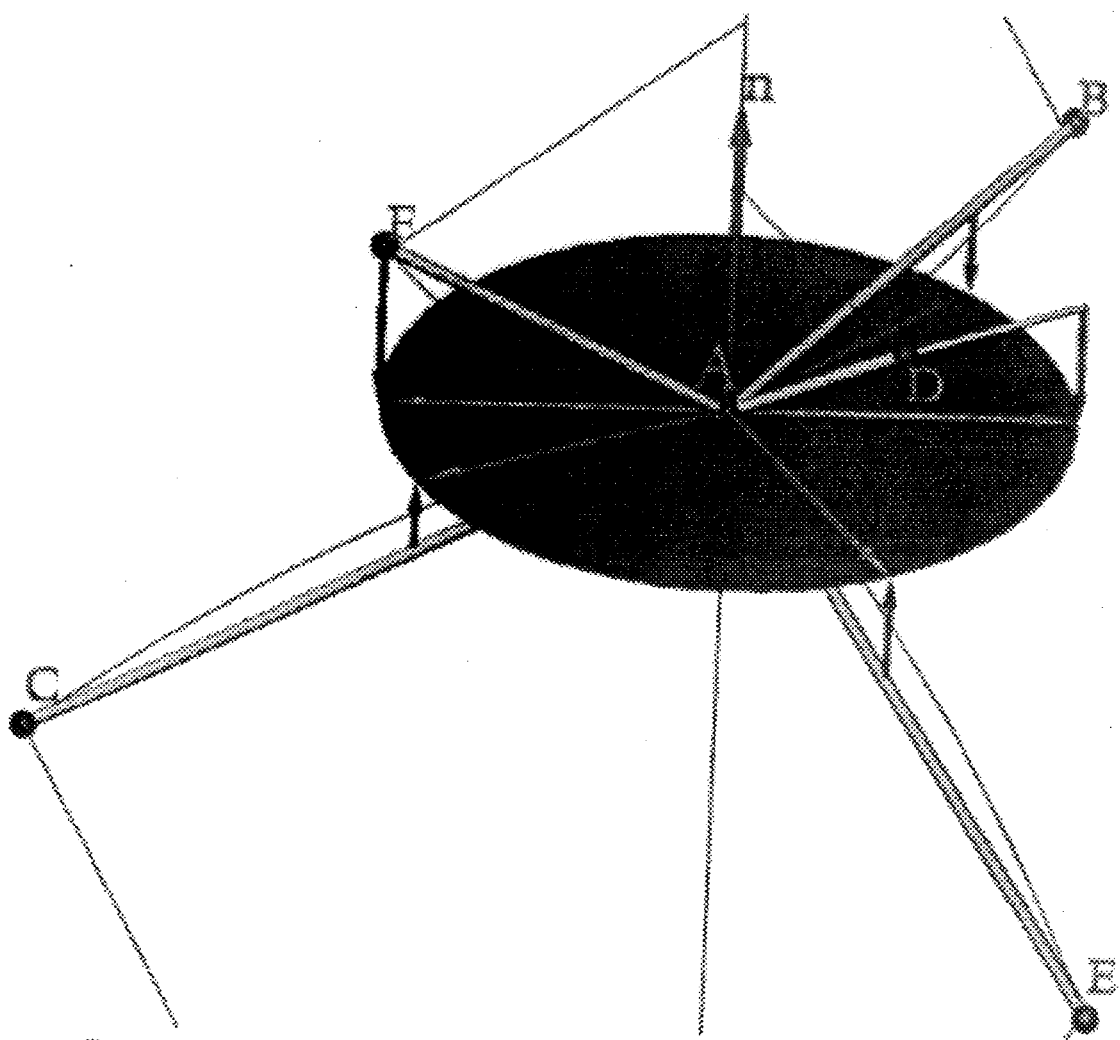
FIG. 16 is an illustration of a set of tangent directions and approximate normal curvatures.
FIG. 17 is a table of an example of a least squares fit curvature.

Once vertex normal vectors and incident tangent directions have been computed, the principal curvatures and principal directions at each vertex are calculated. The approach of the present invention uses a least squares fit of sample tangent directions and normal curvatures to compute the principal directions and curvatures. The initialization of these values is very important to the speed of convergence. First consider the situation shown in FIG. 9. A vertex is shown with a number of incident edges. For each edge the curvature implied by that edge emanating from the vertex is calculated. Starting with edge $\vec{p}_i$, $\vec{p}_n$, $\vec{p}_n$ is reflected through the normal and a circle is fit through $\vec{p}'_n$, $\vec{p}_i$ and $\vec{p}_n$. As shown in FIG. 15, the radius of the resulting circle is the radius of curvature. The reciprocal of this radius of curvature is the approximate normal curvature in the direction of $\hat{t}_n$. Repeating this procedure for each of the incident edges provides a set of sample tangent directions and approximate normal curvatures, as shown in FIG. 16. The set of tangent directions and approximate normal curvatures is used to compute a least squares fit for the principal directions $\hat{e}_1$, $\hat{e}_2$ and principal curvatures $\kappa_1$, $\kappa_2$ of the surface at the vertex as follows. The expression for normal curvature expressed with respect to any convenient orthonormal basis in the plane is first defined by the normal, $$\kappa_n = \hat{t} \cdot [K] \cdot \hat{t}$$

$$[K] = \begin{bmatrix} \hat{e}_{1,x} & \hat{e}_{1,y} \\ -\hat{e}_{1,y} & \hat{e}_{1,x} \end{bmatrix}^{-1} \cdot \begin{bmatrix} \kappa_1 & 0 \\ 0 & \kappa_2 \end{bmatrix} \cdot \left( \begin{bmatrix} \hat{e}_{1,x} & \hat{e}_{1,y} \\ -\hat{e}_{1,y} & \hat{e}_{1,x} \end{bmatrix}^{-1} \right)^T.$$

The normal curvature is then found by multiplying the curvature tensor K twice by the desired tangent direction defined relative to the local basis. From this expression, the tangent components are extracted to produce an over determined set of m+1 linear equations:

$$\begin{bmatrix} \hat{t}_{0,x}^2 & \hat{t}_{0,x}\hat{t}_{0,y} & \hat{t}_{0,y}^2 \\ \hat{t}_{1,x}^2 & \hat{t}_{1,x}\hat{t}_{1,y} & \hat{t}_{1,y}^2 \\ \cdot & \cdot & \cdot \\ \hat{t}_{m,x}^2 & \hat{t}_{m,x}\hat{t}_{m,y} & \hat{t}_{m,y}^2 \end{bmatrix} \cdot \begin{bmatrix} \hat{e}_{1,x}^2\kappa_1 + \hat{e}_{1,y}^2\kappa_2 \\ 2\hat{e}_{1,x}\hat{e}_{1,y}(\kappa_1 - \kappa_2) \\ \hat{e}_{1,x}^2\kappa_2 + \hat{e}_{1,y}^2\kappa_1 \end{bmatrix} = \begin{bmatrix} \kappa_{n,0} \\ \kappa_{n,1} \\ \cdot \\ \kappa_{n,m} \end{bmatrix} \quad (3)$$

$$Ax = b$$

where the unknowns, x, are expressions involving the principal directions and principal curvatures. The general formula for computing the least squares solution to this type of system is $A^T A \bar{x} = A^T b$, where $\bar{x}$ is the least squares solution for "x" in equation (3). Having solved for x, three equations and four unknowns remain $$\begin{bmatrix} \hat{e}_{1,x}^2\kappa_1 + \hat{e}_{1,y}^2\kappa_2 \\ 2\hat{e}_{1,x}\hat{e}_{1,y}(\kappa_1 - \kappa_2) \\ \hat{e}_{1,x}^2\kappa_2 + \hat{e}_{1,y}^2\kappa_1 \end{bmatrix} = \begin{bmatrix} \bar{x}_0 \\ \bar{x}_1 \\ \bar{x}_2 \end{bmatrix}.$$

Adding the fact that $\hat{e}_{1,x}^2 + \hat{e}_{1,y}^2 = 1$, makes it possible to solve for the principal directions and principal curvatures.

FIG. 17 provides the results of a least squares fit to the sample directions and curvatures shown in FIG. 16. The resulting principal directions and curvatures are $$\kappa_1 = 0.9548 \quad \hat{e}_1 = \{0.1266, 0.0, -0.9919\}$$

$$\kappa_2 = -0.6647 \quad \hat{e}_2 = \{0.9919, 0.0, 0.1266\} \quad (4)$$

A set of principal directions and principal curvatures locally define the geometry of a surface. Given principal directions and curvatures, the normal curvature in a given tangent $\hat{t}$ direction is computed:

$$\kappa_n = \kappa_1(\hat{e}_1 \cdot \hat{t})^2 + \kappa_2(\hat{e}_2 \cdot \hat{t})^2. \quad (5)$$

Figure 18:
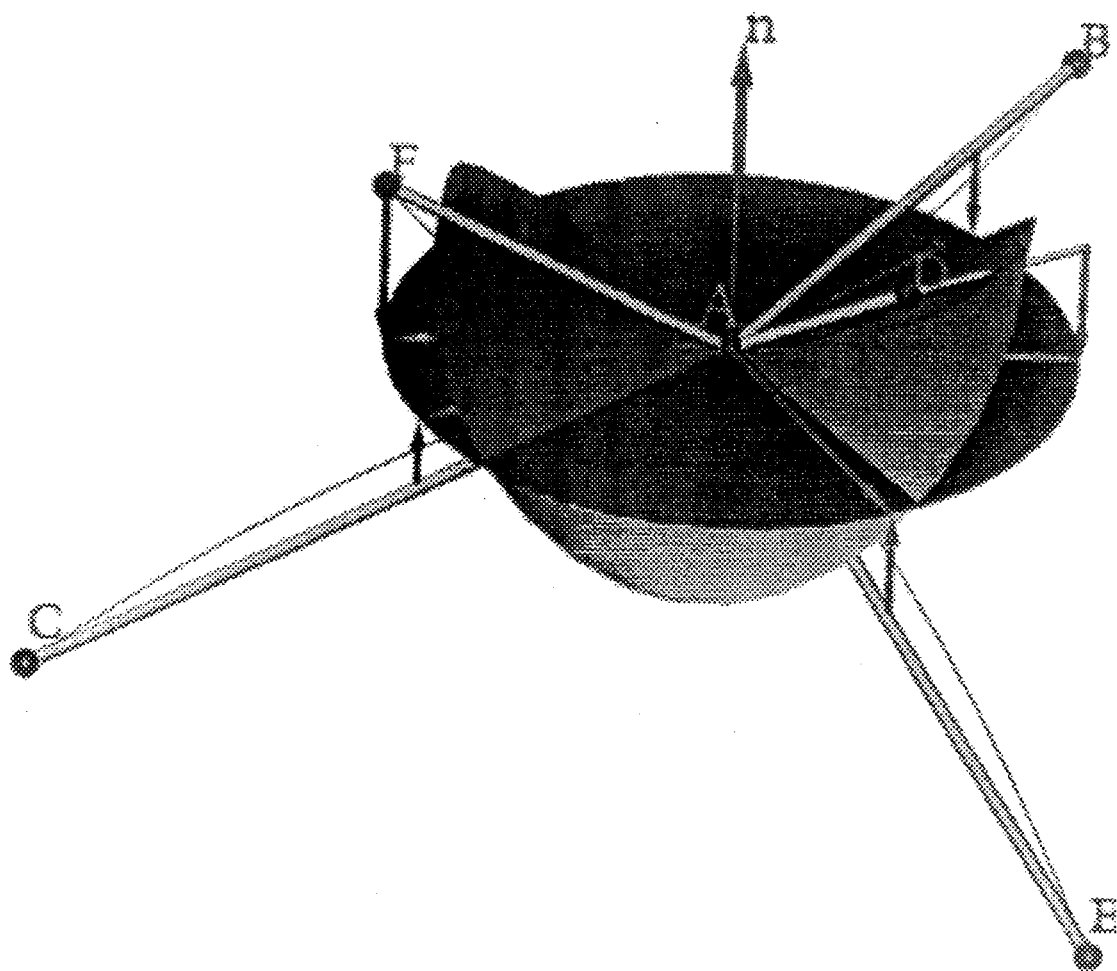
FIG. 18 is an illustration of the least squares fit curvature of FIG. 17.
Figure 19:
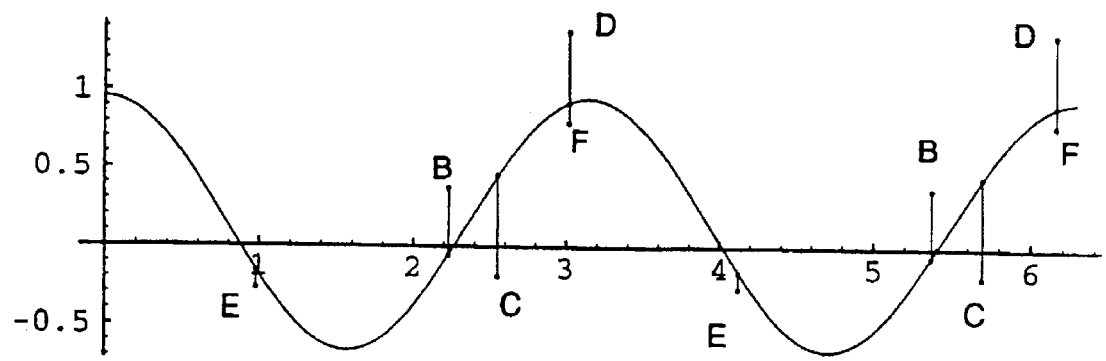
FIG. 19 is an illustration of a curvature plot of the least squares fit curvature of FIG. 18.

An example least squares solution can be illustrated in two ways. First, in FIG. 18, with a surface swept out by the osculating circles as rotated about the normal, changing radius according to equation (5) with curvature values (4); the arcs of the approximate osculating circles are also shown. Second, in FIG. 19 the normal curvature is plotted versus tangent direction. Vertical lines are drawn connecting the approximate normal curvatures with the least squares fit curvatures.

To complete the initialization of the network, the scalars associated with each curve are set as follows: m, the magnitude of the first derivative, is set to the chord length; α, which relates the first and second derivatives, is set to zero so that the derivatives are orthogonal and the curves are arc length parameterized at their end points; and c is set to zero so that the curve's only curvature component is the normal curvature in the tangent direction.

Since the quality of the network directly impacts the quality of the resulting surface, an optional heuristic constraint is presented. A very successful method for improving network quality is to force suitable opposing pairs of curve segments incident to a common vertex of the network to join with $G^2$ continuity. Pairs of curves are made $G^1$ continuous by forcing them to share tangent vectors. $G^2$ continuity is imposed by forcing the curves to also share the binormal component, c, from equation (3). Curves may be paired up automatically at even order vertices. At odd order vertices and at vertices where custom or partial pairings are desired, matches may be specified manually.

Figure 20:
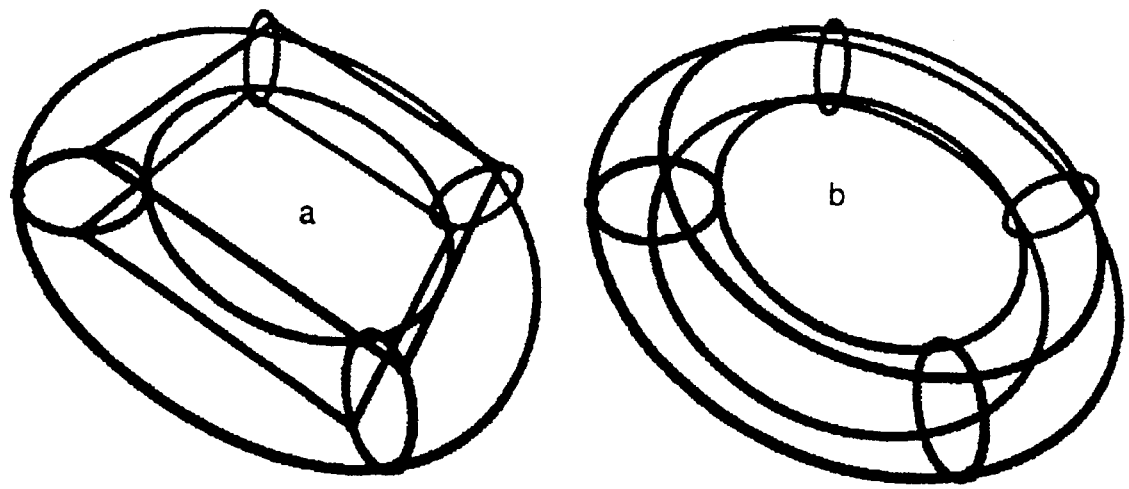
FIGS. 20a and 20b illustrate optional network continuity constraints, $G^0$ versus $G^2$.
Figure 21:
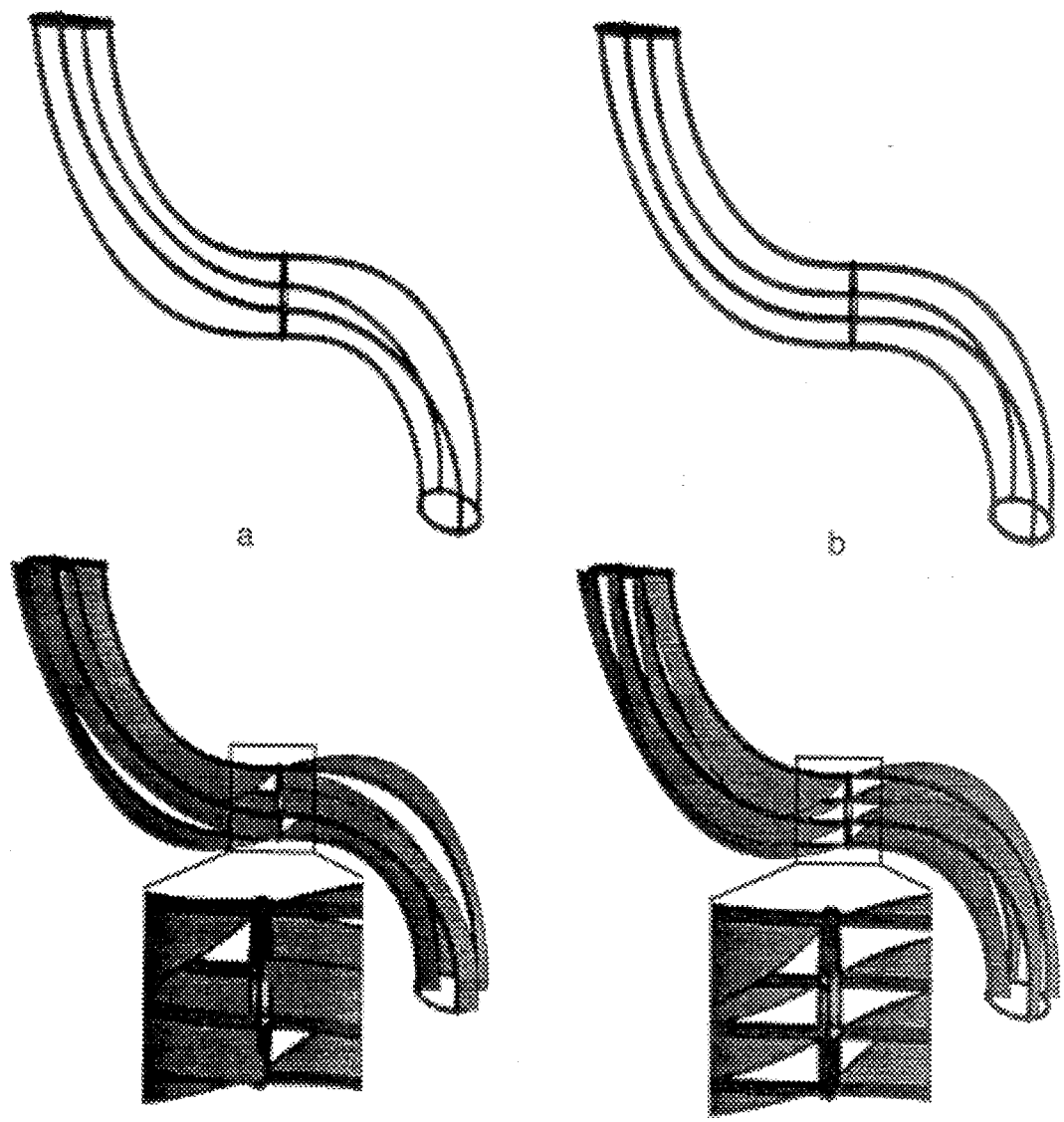
FIGS. 21a and 21b illustrate optional network continuity constraints, $G^0$ versus $G^1$.

During initialization, shared tangent vectors are set to the average of the individual tangents computed by chord projection. In a first example, FIGS. 20a and 20b illustrate curve continuity applied to 16 regularly spaced points on the surface of a torus. FIG. 20b illustrates the improvement to the network when $G^2$ continuity is imposed. In this second example, a case is illustrated where there is an appreciable difference between a network of curves that are matched up with $G^1$ continuity versus a network of curves where paired up curves are constrained to meet with $G^2$ continuity. In this case the network passes through 12 points on a symmetrical S-shaped tube. The network specification includes position, surface normal and curvature as well as curve tangent constraints. In FIG. 21a the curves of the network meeting with $G^1$ continuity; in the lower half of the figure the curves running lengthwise along the tube have curvature profiles attached, highlighting the distribution of curvature. Note that in FIG. 21b the curves are $G^2$ continuous. This latter $G^2$ continuous network is of superior quality, in part, because some of the curves of the network are naturally $G^2$ continuous and those that are only $G^1$ continuous create asymmetry unless constrained to $G^2$ continuity.

In the computer aided design of curved surfaces there is a wide range of requirements. While it is necessary to model regular shapes such as cylinders, cones, tori, and spheres, it is also important that free-form shapes be modeled with ease. Often, it is also necessary that surfaces exactly meet a set of positional, tangent, and curvature constraints. In all cases, surface fairness is of great importance. The minimum variation surfaces (MVS) of the present invention meet all of these requirements.

The choice of the MVS functional for minimization was prompted by the need for very high quality surfaces with predictable, intuitive behavior, and the desire to capture shapes commonly used in geometric modeling. The fairness of curves and surfaces has been studied extensively and has been shown to be closely related to how little and how smoothly a curve or surface bends.

Traditional work on the fairness of surfaces focuses on strain energy, minimizing the area integral of the sum of the principal curvatures squared $$\int \kappa_1^2 + \kappa_2^2 \, dA.$$

The approach of the present invention minimizes the variation of curvature, rather than its magnitude. This is done by minimizing the area integral of the sum of the squared magnitudes of the derivatives of the normal curvatures taken in the principal directions:

$$\int \frac{d\kappa_n^2}{d\hat{e}_1} + \frac{d\kappa_n^2}{d\hat{e}_2} \, dA.$$

Like the MVC functional described above, the MVS functional has associated shapes that are optimal in the sense that the functional evaluates to zero. In the case of the MVS functional, the shapes belong to a special family of curved surfaces called cyclides which includes spheres, cylinders, cones, and tori. These shapes all have lines of principal curvature where the associated normal curvature remains constant. Lines of principal curvature follow the paths of minimum and maximum normal curvature across a surface. Also, like the MVC functional, the MVS are invariant under rigid body transformations and uniform scaling, but similarly the MVS changes functional value with changes in scale. Specifically, for a change in scale by a factor of $\gamma$, the MVS functional changes value by a factor of $1/\gamma^2$. A scale invariant MVS functional (SI-MVS), similar to the SI-MVC functional, has been designed that counters the inverse square factor by multiplying the standard MVS functional by the area of the surface, which varies as the square of the scale:

$$\left(\int dA\right) \left(\int \frac{d\kappa_n^2}{d\hat{e}_1} + \frac{d\kappa_n^2}{d\hat{e}_2} \, dA\right).$$

In the remainder of this specification, only the standard MVS functional is discussed since the computation of the SI-MVS functional is a straight forward extension in view of the prior discussion herein.

Figure 22:
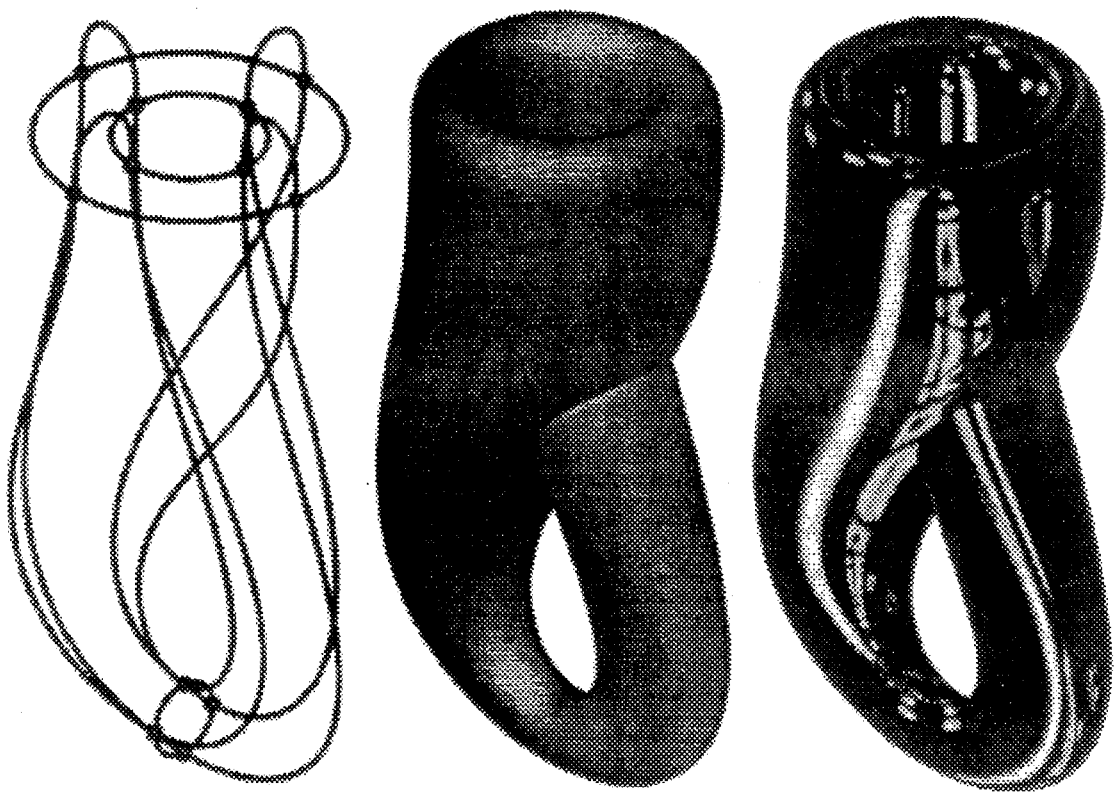
FIG. 22 is an illustration of a Klein bottle.

MVS are specified using interpolated geometric constraints. The resulting models accurately reflect these specifications and are free of unwanted wrinkles, bulges, and ripples. When the given constraints permit, the resulting surfaces form portions of spheres, cylinders, cones, and tori. Specification of a desired shape is straightforward, allowing simple or complex shapes to be described easily and compactly. For example, a Klein bottle is specified with ease; only twelve point-tangent constraints are used to model the surface shown in FIG. 22.

Figure 23:
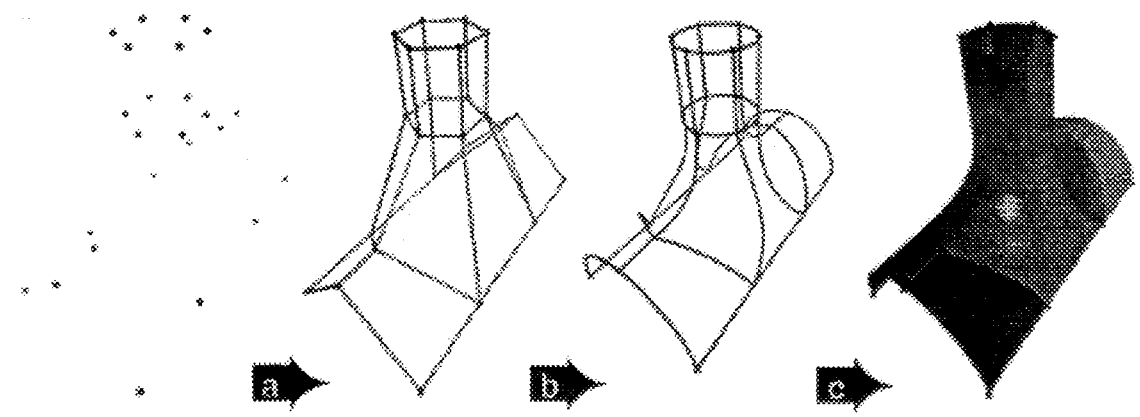
FIG. 23 illustrates the steps in the construction of a surface.

The problem of creating a surface interpolating a collection of geometric constraints is treated as one of scattered data interpolation. As illustrated in FIG. 23, the interpolation problem is broken into three steps: (a) connectivity definition; (b) curve network computation; and (c) patch blending. In accordance with the topological type of the desired surface, the geometric constraints are first expressed by a network of straight edges. These are then replaced with suitable curve segments, and an optimized network is computed composed of minimum variation curves (MVN) subject to the specified geometric constraints and the additional constraint that the curve segments meet with second order geometric continuity, $G^2$, at the vertices. Finally, an interpolatory minimum variation surface (MVS) is computed, interpolating the MVN with tangent continuity. In a first approach, the boundaries of the MVS patches are fixed, interpolating the previously constructed curve network. Alternatively, the surface calculation may use the MVN as a starting point and modify its geometry during surface calculation. The latter approach yields even smoother surfaces, but at a substantially higher computational expense. The higher quality surfaces result because the curves of an MVN resulting from a given constraint set do not always lie in the MVS resulting from the same set of constraints.

During the modeling process, the connectivity of the geometrical constraints is typically established as a natural outgrowth of the design process. The techniques described here are also amenable to true scattered data interpolation, in which case connectivity must first be derived with some other method, possibly based on some minimal triangulation on the data points. The method of the present invention is based on triangular and quadrilateral patches. All constraints are located at corners of these patches. Currently, the user must add additional vertices and edges to the network so that it has only three- and four-sided openings. These additional vertices are not constraints and are appropriately positioned by the curve network computation and patch blending phases of the construction.

Based on the MVN, the computation of the MVS interpolatory surface is accomplished using constrained optimization. The geometric constraints are imposed by constructions similar to those used in the calculation of the network. Inter-patch tangent continuity is imposed by means of a penalty function that is equal to zero when the patches composing the MVS meet with tangent continuity and proportionally greater than zero for any $G^1$ discontinuity. In addition, a similar penalty function may be applied to impose curvature continuity. The use of penalty functions alone does not guarantee perfect continuity. Exact $G^1$ continuity may be achieved in a subsequent phase of optimization by using Lagrange multipliers or by using the continuum method, a continuous reduction to zero of the weight of the MVS term in the functional. This reduction of the MVS functional to zero is equivalent to increasing the $G^1$ penalty to infinity. In practice, it is not always necessary to resort to this second phase because the surfaces resulting from the first phase are of high quality and sufficiently close to being tangent continuous.

The computation of an MVS satisfying a given set of constraints is broken into several steps. In this next section, focus is now placed on the last phase of the algorithm where surface patches are fit to a $G^2$ continuous MVN. The curves may remain fixed or they may be used simply as a starting point for optimization. The choice between fixed and variable curves is up to the designer and does not affect the algorithms described here.

The MVS is approximated by a quilt of parametric polynomial patches which interpolate the curve network, satisfy the geometric constraints, and meet with approximate tangent plane continuity. The surface functional is then minimized by varying the surface parameters that are not fixed by geometric constraints.

The curves of the network are represented by quintic Hermite polynomial segments; one segment replaces each edge of the network of constraints. Consequently, the patches making up the interpolatory surface have to be at least [bi-]quintic patches. One patch is used for each opening in the network. Though single patches have been found to have sufficient descriptive power, it is simple to subdivide network patches creating multiple patches per opening. The use of multiple patches improves the approximation of the theoretical MVS surface, which in general has no closed form representation.

Even though the boundary curves are in the Hermite form, Bézier patches have been chosen because of their superior numerical characteristics. Also, Bézier patches are more amenable to rendering, and may be rendered directly by subroutines found in the graphics library of workstations, such as the line of Silicon Graphics IRIS® workstations manufactured by Silicon Graphics, Inc., of Mountain View, Calif.

The fairness functional for surfaces, equation (6) below, is defined in terms of an area integral. To evaluate the functional and its gradient in the context of the parametric polynomial surface patches described above, the functional must be converted to a compatible form. The calculations necessary to evaluate the functional are outlined below. The fairness functional is computed for each patch, and the value of the functional for the surface as a whole is the sum of the values for each patch. The area-based definition $$\int \frac{d\kappa_n^2}{d\hat{e}_1} + \frac{d\kappa_n^2}{d\hat{e}_2} \, dA \tag{6}$$

is converted to integrals of functions of the independent parameters u and v in $\vec{S}(u, v)$. For quadrilateral patches, the bounds of the integrals are set to vary over the unit square, and the differential with respect to area is converted to differentials in u and v $$\int_0^1 \int_0^1 \left( \frac{d\kappa_n^2}{d\hat{e}_1} + \frac{d\kappa_n^2}{d\hat{e}_2} \right) \|S_u \times S_v\| du dv \tag{7}$$

where $$\|S_u \times S_v\| = \sqrt{EG - F^2},$$

and $$E = \vec{S}_u \cdot \vec{S}_u \quad F = \vec{S}_u \cdot \vec{S}_v \quad G = \vec{S}_v \cdot \vec{S}_v.$$

The variables E, F, and G, are from the first fundamental form from differential geometry. The principal curvatures $\kappa_1$ and $\kappa_2$ are the normal curvatures in the principal directions. Thus the problem of computing $d\kappa_n/d\hat{e}_1$ and $d\kappa_n/d\hat{e}_2$ becomes one of computing $d\kappa_1/d\hat{e}_1$ and $d\kappa_2/d\hat{e}_2$. First, expressions for these are found in terms of derivatives taken in the direction of the parametric derivatives $$\frac{d\kappa_1}{d\hat{e}_1} = \frac{d\kappa_1}{du} (\hat{e}_1 \cdot \hat{S}_u) + \frac{d\kappa_1}{dv} (\hat{e}_1 \cdot \hat{S}_v)$$

$$\frac{d\kappa_2}{d\hat{e}_2} = \frac{d\kappa_2}{du} (\hat{e}_2 \cdot \hat{S}_u) + \frac{d\kappa_2}{dv} (\hat{e}_2 \cdot \hat{S}_v)$$

where $$\hat{S}_u = S_u/(\|S_u\|) \quad \hat{S}_v = S_v/\|S_v\|.$$

Next the derivatives of $\kappa_1$, $\kappa_2$ taken in the direction of the parametric derivatives are defined using derivatives with respect to the surface parameters u and v:

$$\frac{d\kappa_i}{d\hat{u}} = \frac{d\kappa_i}{du} \frac{1}{\|\vec{S}_u\|} \quad \frac{d\kappa_i}{d\hat{v}} = \frac{d\kappa_i}{dv} \frac{1}{\|\vec{S}_v\|}.$$

Finally, the parametric derivatives of $\kappa_1$ and $\kappa_2$ are computed from an expression derived from the fact that the principal curvatures are the eigenvalues of the curvature tensor. The expression for the curvature tensor is $$\begin{bmatrix} a_{11} & a_{21} \\ a_{12} & a_{22} \end{bmatrix}, \tag{8}$$

where $$a_{11} = \frac{fF - eG}{EG - F^2} \quad a_{21} = \frac{eF - fE}{EG - F^2}$$

$$a_{12} = \frac{gF - fG}{EG - F^2} \quad a_{22} = \frac{fF - gE}{EG - F^2}$$

$$e = \hat{n} \cdot \vec{S}_{uu} \quad f = \hat{n} \cdot \vec{S}_{uv} \quad g = \hat{n} \cdot \vec{S}_{vv}.$$

E, F, and G are defined as in equation (7), e, f, and g are the terms of the second fundamental form from differential geometry. Since $\kappa_1$ and $\kappa_2$ are the eigenvalues of the curvature tensor, the following expression results:

$$\kappa_i = \frac{a_{11} + a_{22} \pm \sqrt{a_{11}^2 + 4a_{12}a_{21} - 2a_{11}a_{22} + a_{22}^2}}{2}.$$

This expression is in terms of the surface parameters u and v. Using the chain rule, it is simple to compute the required parametric derivatives, $d\kappa_i/du$, $d\kappa_i/dv$. Note that in computing the parametric derivatives of e, f, and g, it is helpful to have a simple way of computing $\hat{n}_u$ and $\hat{n}_v$:

$$\hat{n}_u = \kappa_1(\vec{S}_u \cdot \hat{e}_1)\hat{e}_1 + \kappa_2(\vec{S}_u \cdot \hat{e}_2)\hat{e}_2$$
$$\hat{n}_v = \kappa_1(\vec{S}_v \cdot \hat{e}_1)\hat{e}_1 + \kappa_2(\vec{S}_v \cdot \hat{e}_2)\hat{e}_2.$$

The conversion of the MVS functional to a double integral of a parametric polynomial representation has been outlined. Because it is impractical to compute the integral analytically, the numerical integration is used to evaluate the integral. Instead of using standard Gauss-Legendre quadrature, the Lobatto quadrature is used. Lobatto quadrature has approximately the same convergence and samples the perimeter of the integration domain:

$$\int_0^1 f(x) dx \approx w_1 f(0.0) + \sum_{i=2}^{n-1} w_i f(x_i) + w_n f(1.0)$$

Lobatto's integration formula has been found to be as effective as Gauss-Legendre quadrature for the present application, and since it samples the perimeter, its evaluations may be used to compute continuity penalty functions. As a default, 20 integration points are used in each parametric direction, a satisfactory number for the modeling problems encountered so far. If the number of sample points is reduced, the surface might form a cusp or crease between sample points where the integrator will not "see" it. The first ten sets of abscissas and weight factors for Lobatto's integration formula are tabulated in handbooks of standard mathematical functions.

During the optimization process, it is necessary to compute the gradient of the functional with respect to all the available degrees of freedom. When computing the curve network, analytical partial derivatives are used in conjunction with numerical integration to compute the gradient. In the case of surfaces, the functional is of such complexity that it is impractical to compute the gradient in this fashion. Instead, the central differences are used to approximate the partial derivatives. The standard central difference formula for computing the derivative of f(a) with respect to a follows:

$$f'(a) = \frac{f(a+h) - f(a-h)}{2h}. \tag{9}$$

In order to get accurate derivative estimates, it is necessary to choose the difference value h carefully. An optimum value of h balances the trade-off between the discretization error resulting from a large h and an increasing relative roundoff error resulting from too small a value for h. The value h is initialized to a reasonable value based on the number of significant bits in the computation of the functional and h is subsequently updated periodically based on the observed number of significant bits in the difference computation. An accepted rule of thumb dictates that about half the significant bits should cancel out when the difference is computed.

First, the number of significant bits are found in computing the functional. By computing the fairness functional, F, in both single and double precision, the number of significant bits are found in the single precision calculation:

$$s_{single} = -\log_2 \left| \frac{F_{single} - F_{double}}{F_{double}} \right|. \tag{10}$$

Currently, the calculations are carried out in double precision. $s_{single}$ is computed using equation (10) applied to a sample of MVS calculation problems. $s_{single}$ varies somewhat both from interpolation problem to interpolation problem and from the beginning to the end of an optimization. Averaging several sample values, a value of $s_{single} \approx 10.5$ is computed. Because $s_{single}$ can only be directly computed, the value of $s_{double}$ is computed by assuming a gain of approximately 29 bits of precision corresponding to the 29 additional fractional bits available in double precision. Using this computation, $s_{double} \approx 39.5$.

At the start of an optimization, h is initialized to $h = F \times 2^{-16}$. After each difference computation, the number of significant bits is computed in the difference value d and h is adjusted if the number of significant bits is not within set bounds. The number of significant bits in the difference computation is computed $$\begin{aligned} d &= s_{double} + \log_2 \left( \frac{2|f(a) - f(a+h)|}{|f(a) + f(a+h)|} \right) \\ &= s_{double} + \log_2(2|f(a) - f(a+h)|) - \\ &\quad \log_2(|f(a) + f(a+h)|) \end{aligned}$$

The difference value h is adjusted as follows $$\text{if} \left( d < \frac{s_{double}}{3} \right) h = 1.5h$$

$$\left( d > \frac{2s_{double}}{3} \right) h = 0.75$$

Though the specific values of 1.5 and 0.75 have been chosen empirically, it is important that they not be reciprocals of each other. If they were reciprocals, the risk of h oscillating between two values, one too large and one too small, would be present. The value of a finite difference step size is usually fixed for the duration of an optimization. The approach of the present invention of continually adjusting h has the advantage that h adapts to different stages in the optimization, depending on the functional and its gradient. Also note that since different degrees of freedom have differing numerical behavior, a custom finite difference value h is associated with each DOF. Finally, an inexpensive "trick" is used to preserve as much precision as possible when adding the difference value to the associated DOF to produce the perturbed DOF q $$q = a + h \quad h = q - a.$$

This adjusts h so that it corresponds precisely to the difference between a and the perturbed value of a, q.

The problem of guaranteeing the inter-patch continuity of a quilt of patches is solved by incorporating the continuity problem into the optimization used to shape surfaces. This is acheived by adding to the objective function a penalty function for lack of continuity. This penalty function evaluates to zero when surfaces meet continuously and increases sharply with the magnitude of discontinuity. Because of the nature of gradient-based optimization, it is important that this penalty function have zero gradient at its minimum point. The formulation of a penalty function for tangent continuity and a similar penalty function for $G^2$ continuity are discussed below.

An attractive penalty is based on the integration of a cross-boundary discontinuity function. Such a penalty function is formed from parameterization independent measures by computing the surface normal along either side of the patch-patch boundary. One such function integrates a function of the cosine of the angle formed by the normals $$P_{G^1} = (1 - (\hat{n}_a \cdot \hat{n}_b))^2 \quad (\hat{n}_a \cdot \hat{n}_b) \to 1 \quad \nabla P_{G^1} = 0. \tag{11}$$

This equation is satisfactory except that it is not strongly positive for large discontinuities, in fact its magnitude is limited to 2.0. Equation (12) computes a function of (11) such that its values range from 0 to $\infty$.

$$P_{G^1} = \left( \frac{1 - (\hat{n}_a \cdot \hat{n}_b)}{1 + (\hat{n}_a \cdot \hat{n}_b)} \right)^2 \tag{12}$$

$$(\hat{n}_a \cdot \hat{n}_b) \to 1 \qquad \nabla P_{G^1} = 0°$$

$$(\hat{n}_a \cdot \hat{n}_b) \to -1 \qquad P_{G^1} = \infty$$

Since the normal vector is computed as part of evaluating the fairness functional, and the fairness functional is integrated using Lobatto quadrature, the same quadrature rule is used to integrate equation (12). In order to show that a polynomial of order n is identically zero, it is only necessary to show that it is equal to zero at n distinct locations. The roots of equation (12) are identical to the roots of the determinant of tangent functions F', G' and H', a polynomial of degree 14 in the biquintic-biquintic case. Thus if equation (12) is sampled at least 15 times, it is guaranteed that if the result is zero, then the function itself is also zero. This latter $G^1$ penalty function $P_{G^1}$ is more efficient to compute, and it is independent of parameterization.

The problem of constructing a $G^2$ continuous network of polynomial patches is extremely difficult to solve exactly due to the second order analogue of the twist compatibility problem, a well known problem in the field of surface design. The penalty based methods of the present invention avoid this problem by using methods similar to the $G^1$ penalty function to push the optimization toward a $G^2$ continuous solution. The penalty function is constructed from the geometric measures of curvature, $\kappa_1$, $\kappa_2$, $\hat{e}_1$, $\hat{e}_2$. Given a pair of patches that meet with $G^1$ continuity, patches need only have equal normal curvatures in a single transverse direction in order to assure $G^2$ continuity. From this observation, it is possible to derive a penalty function measuring the difference in normal curvature in the direction perpendicular to the patch-patch boundary. The normal curvature $\kappa_n$ in the direction $\hat{t}$ is $\kappa_n = \kappa_1(\hat{e}_1 \cdot \hat{t})^2 + \kappa_2(\hat{e}_2 \cdot \hat{t})^2$ because $\hat{e}_1 \perp \hat{e}_2$, the normal curvature in the direction $\perp \hat{t}$, is $\perp \kappa_n = \kappa_2(\hat{e}_1 \cdot \hat{t})^2 + \kappa_1(\hat{e}_2 \cdot \hat{t})^2$.

Referring to $\perp \kappa_n$ on adjacent patches as $\kappa_a$, $\kappa_b$, the $G^2$ penalty function is $P_{G^2} = (\kappa_a - \kappa_b)^2$. Note that this function has the necessary property that the gradient is zero when $\kappa_a - \kappa_b = 0$. In order to determine the number of samples required to accurately integrate this function, a similar argument based on the order of the polynomials involved in its evaluation is used. Since the polynomial order is prohibitively high, this function is sampled with the same density as the $G^1$ penalty and the MVS functional. This technique has been found to significantly improve the quality of problematic surfaces.

The $G^1$ and $G^2$ penalty functions are combined with the MVS functional to form the objective function:

$$\int \frac{d\kappa_n^2}{d\hat{e}_1} + \frac{d\kappa_n^2}{d\hat{e}_2} dA + \int P_{G1} ds + \int P_{G2} ds \quad (13)$$

Minimizing this objective function alone does not guarantee $G^2$ or even $G^1$ continuity. This is because using a single quintic patch in each network opening may not provide sufficient degrees of freedom to accurately represent the theoretical minimum variation surface. Two solutions to this problem are possible. First, each patch of the network may be subdivided into multiple patches adding flexible arcs to the MVN, and augmented with the resulting additional degrees of freedom, the optimization may proceed. Second, the continuum methods may be used to achieve final continuity. A continuum method computes a series of solutions to a problem by varying a parameter of the problem. In the present case, equation (13) is modified to allow the influence of the MVS functional to be slowly phased out:

$$w \int \frac{d\kappa_n^2}{d\hat{e}_1} + \frac{d\kappa_n^2}{d\hat{e}_2} dA + \int P_{G1} ds + \int P_{G2} ds \quad w \to 0. \quad (14)$$

This approach iteratively minimizes (14) reducing w by a factor of two before each iteration. Iteration continues until the desired continuity is achieved.

The specification of curves of discontinuity is realized by not evaluating the $G^1$ or $G^2$ penalty functions along the specified curves of discontinuity. Additionally, curves of position specification, tangent specification and curvature specification are handled in a similar fashion. A frozen patch is made to border the curve of position, tangent or curvature specification and shaped to satisfy the specification. The $G^1$ and $G^2$ penalty functions are then used to impose the specification. Since the patch on one side of the curve is frozen, the patch undergoing optimization deforms to satisfy the curve specification, meeting with the frozen patch with $G^0$, $G^1$ or $G^2$ continuity depending on whether position, tangent, or curvature was specified along the curve.

The gradient descent scheme described above starts with an initial surface and iteratively refines that surface until the surface functional reaches a (local) minimum and an optimal surface is reached. In this section methods are discussed for finding a suitable initial surface. In terms of the desired optimization, the goal is to find an initial point in the proper "valley" of the solution space such that the desired surface is found as the minimal point in that valley. The optimization requires that initial values be provided for any parameters not explicitly set. An MVN is used to initialize the control points on the perimeter of each patch. Finally, all of the interior control points are positioned so that the twist vector, and third and fourth order derivatives are zero at the corners of the patch:

$$\vec{S}_{uv}(u, v) = 0 \quad \vec{S}_{uuv}(u, v) = 0$$
$$\vec{S}_{uvv}(u, v) = 0 \quad \vec{S}_{uuvv}(u, v) = 0$$

u, v = {0, 1}

This final technique has been found to be simple and robust for a large variety of problems.

Although the present invention has been described in terms of specific embodiments with respect to curves networks and surfaces, it is anticipated that alterations and modifications of the methods disclosed therein will no doubt become apparent to those skilled in the art. It is therefore intended that the following claims be interpreted as covering all such alterations and modifications as fall within the true spirit and scope of the invention.

I claim:

1. A method for producing a representation of a curve for display by a computer system, comprising:
   specifying a desired shaped of the curve utilizing a set of geometric constraints;
   specifying a scale invariant functional of the desired shape that is locally minimized and operative to measure a magnitude of variation in a curvature of the desired shape;
   producing a representation of the curve based on the functional and the set of geometric constraints; and
   displaying the representation of the curve via an output device to create a visual or physical embodiment of the curve.

2. The method as recited in claim 1, wherein the functional is further operative to measure variations in a torsion of the desired shape.

3. The method as recited in claim 2, wherein the functional is a sum of an arc length integral of a square of a magnitude of an arc length derivative of the curvature of the desired shape and an arc length integral of a square of an arc length derivative of the torsion of the desired shape.

4. The method as recited in claim 3, wherein said functional is made scale invariant by multiplying the sum by a cube of an arc length of the desired shape.

5. The method as recited in claim 1 wherein the set of geometric constraints includes at least one point that the desired shape of the curve must interpolate.

6. The method as recited in claim 1 wherein the set of geometric constraints includes at least one tangent that the desired shape of the curve must interpolate.

7. The method as recited in claim 1 wherein the set of geometric constraints includes at least one curvature that the desired shape of the curve must interpolate.

8. The method as recited in claim 1, wherein the set of geometric constraints includes at least one torsion that the desired shape of the curve must interpolate.

9. The method as recited in claim 1 wherein the set of geometric constraints includes at least one $G^2$ discontinuity specification for the desired shape of the curve.

10. The method as recited in claim 1, wherein the set of geometric constraints includes at least one $G^1$ discontinuity specification for the desired shape of the curve.

11. The method as recited in claim 1, wherein the magnitude of variation is an arc length integral of a square of a magnitude of an arc length derivative of the curvature of the desired shape.

12. The method as recited in claim 1, wherein the functional is made scale invariant by multiplying the magnitude of variation by a cube of an arc length of the desired shape.

13. The method as recited in claim 1, wherein the functional is made scale invariant by multiplying the magnitude of curvature by an arc length of the desired shape.

14. A method for producing a representation of a curve for display by a computer system, comprising:

specifying a desired shape of the curve utilizing a set of geometric constraints;

specifying a functional of the desired shape that is locally minimized, operative to measure a magnitude of variation in a curvature of the desired shape, and operative to measure a magnitude of variation in a torsion of the desired shape;

producing a representation of the curve based on the specified functional and the specified set of geometric constraints; and displaying the representation of the curve via an output device to create a visual or physical embodiment of the curve.

15. The method as recited in claim 14, wherein the functional is a sum of an arc length integral of a square of a magnitude of an arc length derivative of the curvature of the desired shape and an arc length integral of a square of an arc length derivative of the torsion of the desired shape.

16. The method as recited in claim 14, wherein the set of geometric constraints includes at least one point that the desired shape of the curve must interpolate.

17. The method as recited in claim 14, wherein the set of geometric constraints includes at least one tangent that the desired shape of the curve must interpolate.

18. The method as recited in claim 14, wherein the set of geometric constraints includes at least one curvature that the desired shape of the curve must interpolate.

19. The method as recited in claim 14, wherein the set of geometric constraints includes at least one torsion that the desired shape of the curve must interpolate.

20. The method as recited in claim 14, wherein the set of geometric constraints includes at least one $G^2$ discontinuity specification for the desired shape of the curve.

21. The method as recited in claim 14, wherein the set of geometric constraints includes at least one $G^1$ discontinuity specification for the desired shape of the curve.

22. The method as recited in claim 14, wherein the magnitude of variation is an arc length integral of a square of a magnitude of an arc length derivative of the curvature of the desired shape.

23. A method for producing a representation of a curve for use by a computer system, comprising:

specifying a desired shape of the curve utilizing a set of geometric constraints;

specifying a scale invariant functional of the desired shape that is locally minimized and operative to measure a magnitude of curvature of the desired shape;

producing a representation of the curve based on the functional and the set of geometric constraints; and displaying the representation via an output device to create a visual or physical embodiment of the curve.

24. The method as recited in claim 23, wherein the functional is further operative to measure a torsion of the desired shape.

25. The method as recited in claim 24, wherein the functional is a sum of an arc length integral of a square of the magnitude of curvature of the desired shape and an arc length integral of a square of the torsion of the desired shape.

26. The method as recited in claim 25, wherein the functional is made scale invariant by multiplying the sum by a cube of an arc length of the desired shape.

27. The method as recited in claim 23, wherein the set of geometric constraints includes at least one point that the desired shape of the curve must interpolate.

28. The method as recited in claim 23, wherein the set of geometric constraints includes at least one tangent that the desired shape of the curve must interpolate.

29. The method as recited in claim 23, wherein the set of geometric constraints includes at least one curvature that the desired shape of the curve must interpolate.

30. The method as recited in claim 23, wherein the set of geometric constraints includes at least one torsion that the desired shape of the curve must interpolate.

31. The method as recited in claim 23, wherein the set of geometric constraints includes at least one $G^1$ discontinuity specification for the desired shape of the curve.

32. The method as recited in claim 23, wherein the set of geometric constraints includes at least one $G^2$ discontinuity specification for the desired shape of the curve.

33. The method as recited in claim 23, wherein the functional is an arc length integral of a square of the magnitude of curvature of the desired shape.

34. A method for producing a representation of a curve for display by a computer system, comprising:

specifying a desired shape of the curve utilizing a set of geometric constraints;

specifying a functional of the desired shape that is locally minimized, operative to measure a magnitude of curvature of the desired shape, and operative to measure a torsion of the desired shape;

producing a representation of the curve based on the functional and the set of geometric constraints; and displaying the representation of the curve via an output device to create a visual or physical embodiment of the curve.

35. The method as recited in claim 34, wherein the functional is a sum of an arc length integral of a square of the magnitude of curvature of the desired shape and an arc length integral of a square of the torsion of the desired shape.

36. The method as recited in claim 34, wherein the set of geometric constraints includes at least one point that the desired shape of the curve must interpolate.

37. The method as recited in claim 34, wherein the set of geometric constraints includes at least one tangent that the desired shape of the curve must interpolate.

38. The method as recited in claim 34, wherein the set of geometric constraints includes at least one curvature that the desired shape of the curve must interpolate.

39. The method as recited in claim 34, wherein the set of geometric constraints includes at least one torsion that the desired shape of the curve must interpolate.

40. The method as recited in claim 34, wherein the set of geometric constraints includes at least one $G^1$ discontinuity specification for the desired shape of the curve.

41. The method as recited in claim 34, wherein the set of geometric constraints includes at least one $G^2$ discontinuity specification for the desired shape of the curve.

42. The method as recited in claim 34, wherein the functional is an arc length integral of a square of the magnitude of curvature of the desired shape.

43. A method for producing a representation of a network of curves for display by a computer system, comprising:

specifying a desired shape of the network of curves utilizing a set of geometric constraints;

specifying a scale invariant functional of the desired shape that is locally minimized and operative to measure a magnitude of variation in a curvature of the desired shape;

producing a representation of the network of curves based on the functional and the set of geometric constraints; and displaying the representation of the network of curves via an output device to create a visual or physical embodiment of the network of curves.

44. The method as recited in claim 43, wherein the functional is an arc length integral of a square of a magnitude of an arc length derivative of the curvature of the desired shape.

45. The method as recited in claim 43, wherein the functional is further operative to measure variations in a torsion of the desired shape.

46. The method as recited in claim 45, wherein the functional is a sum of an arc length integral of a square of a magnitude of an arc length derivative of the curvature of the desired shape and an arc length integral of a square of an arc length derivative of the torsion of the desired shape.

47. The method as recited in claim 46, wherein the functional is made scale invariant by multiplying the functional by a cube of an arc length of the desired shape.

48. The method as recited in claim 43, wherein the functional is made scale invariant by multiplying the functional by a cube of an arc length of the desired shape.

49. The method as recited in claim 43, wherein the set of geometric constraints includes at least one point that the desired shape of the network of curves must interpolate.

50. The method as recited in claim 43, wherein the set of geometric constraints includes at least one tangent plane that the desired shape of the network of curves must interpolate.

51. The method as recited in claim 43, wherein the set of geometric constraints includes at least one direction of principle curvature of the desired shape that the desired shape of the network of curves must interpolate.

52. The method as recited in claim 43, wherein the set of geometric constraints includes at least one maximum principle curvature of the desired shape that the desired shape of the network of curves must interpolate.

53. The method as recited in claim 43, wherein the set of geometric constraints includes at least one minimum principle curvature of the desired shape that the desired shape of the network of curves must interpolate.

54. The method as recited in claim 43, wherein the set of geometric constraints includes at least one tangent direction that the desired shape of the network of curves must interpolate.

55. The method as recited in claim 43, wherein the set of geometric constraints includes at least one pair of curves that meet with $G^1$ continuity at a node of the network of curves.

56. The method as recited in claim 43, wherein the set of geometric constraints includes at least one pair of curves that meet with $G^2$ continuity at a node of the network of curves.

57. A method for producing a representation of a network of curves for display by a computer system, comprising:

specifying a desired shape of the network of curves utilizing a set of geometric constraints;

specifying a functional of the desired shape that is locally minimized, operative to measure a magnitude of variation in a curvature of the desired shape, and operative to measure variations in a torsion of the desired shape;

producing a representation of the network of curves based on the functional and the set of geometric constraints; and displaying the representation of the network of curves via an output device to create a visual or physical embodiment of the network of curves.

58. The method as recited in claim 57, wherein the functional is a sum of an arc length integral of a square of a magnitude of an arc length derivative of the curvature of the desired shape and an arc length integral of a square of an arc length derivative of the torsion of the desired shape.

59. The method as recited in claim 57, wherein the set of geometric constraints includes at least one point that the desired shape of the network of curves must interpolate.

60. The method as recited in claim 57, wherein the set of geometric constraints includes at least one tangent plane that the desired shape of the network of curves must interpolate.

61. The method as recited in claim 57, wherein the set of geometric constraints includes at least one direction of principle curvature of the desired shape that the desired shape of the network of curves must interpolate.

62. The method as recited in claim 57, wherein the set of geometric constraints includes at least one maximum principle curvature of the desired shape that the desired shape of the network of curves must interpolate.

63. The method as recited in claim 57, wherein the set of geometric constraints includes at least one minimum principle curvature of the desired shape that the desired shape of the network of curves must interpolate.

64. The method as recited in claim 57, wherein the set of geometric constraints includes at least one tangent direction that the desired shape of the network of curves must interpolate.

65. The method as recited in claim 57, wherein the set of geometric constraints includes at least one pair of curves that meet with $G^1$ continuity at a node of the network of curves.

66. The method as recited in claim 57, wherein the set of geometric constraints includes at least one pair of curves that meet with $G^2$ continuity at a node of the network of curves.

67. A method for producing a representation of a network of curves for display by a computer system, comprising:

specifying a desired shape of the network of curves utilizing a set of geometric constraints;

specifying a functional of the desired shape that is locally minimized, operative to measure a magnitude of curvature of the desired shape, and operative to measure a torsion of the desired shape;

producing a representation of the network of curves based on the functional and the set of geometric constraints; and displaying the representation of the network of curves via an output device to create a visual or physical embodiment of the network of curves.

68. The method as recited in claim 67, wherein the functional is a sum of an arc length integral of a square of a magnitude of the curvature of the desired shape and an arc length integral of a square of the torsion of the desired shape.

69. The method as recited in claim 67, wherein the set of geometric constraints includes at least one point that the desired shape of the network of curves must interpolate.

70. The method as recited in claim 67, wherein the set of geometric constraints includes at least one tangent plane that the desired shape of the network of curves must interpolate.

71. The method as recited in claim 67, wherein the set of geometric constraints includes at least one direction of principle curvature that the desired shape of the network of curves must interpolate.

72. The method as recited in claim 67, wherein the set of geometric constraints includes at least one maximum principle curvature that the desired shape of the network of curves must interpolate.

73. The method as recited in claim 67, wherein the set of geometric constraints includes at least one minimum principle curvature that the desired shape of the network of curves must interpolate.

74. The method as recited in claim 67, wherein the set of geometric constraints includes at least one pair of curves that meet with $G^1$ continuity at a node of the network of curves.

75. The method as recited in claim 67, wherein the set of geometric constraints includes at least one tangent direction that the desired shape of the network of curves must interpolate.

76. A method for producing a representation of a network of curves for display by a computer system, comprising:

specifying a desired shape of the network of curves utilizing a set of geometric constraints;

specifying a scale invariant functional of the desired shape that is locally minimized and operative to measure a magnitude of curvature of the desired shape;

producing a representation of the network of curves based on the functional and the set of geometric constraints; and displaying the representation of the network of curves via an output device to create a visual or physical embodiment of the network of curves.

77. The method as recited in claim 76, wherein the functional is an arc length integral of a square of a magnitude of an arc length derivative of the curvature of the desired shape.

78. The method as recited in claim 76, wherein the functional is further operative to measure variations in a torsion of the desired shape.

79. The method as recited in claim 78, wherein the functional is a sum of an arc length integral of a square of a magnitude of the curvature of the desired shape and an arc length integral of a square of the torsion of the desired shape.

80. The method as recited in claim 79, wherein the functional is made scale invariant by multiplying the functional by a cube of an arc length of the desired shape.

81. The method as recited in claim 76, wherein the functional is made scale invariant by multiplying the functional by a cube of an arc length of the desired shape.

82. The method as recited in claim 76, wherein the set of geometric constraints includes at least one point that the desired shape of the network of curves must interpolate.

83. The method as recited in claim 76, wherein the set of geometric constraints includes at least one tangent plane that the desired shape of the network of curves must interpolate.

84. The method as recited in claim 76, wherein the set of geometric constraints includes at least one direction of principle curvature that the desired shape of the network of curves must interpolate.

85. The method as recited in claim 76, wherein the set of geometric constraints includes at least one maximum principle curvature that the desired shape of the network of curves must interpolate.

86. The method as recited in claim 76, wherein the set of geometric constraints includes at least one minimum principle curvature that the desired shape of the network of curves must interpolate.

87. The method as recited in claim 76, wherein the set of geometric constraints includes at least one pair of curves that meet with $G^1$ continuity at a node of the network of curves.

88. The method as recited in claim 76, wherein the set of geometric constraints includes at least one tangent direction that the desired shape of the network of curves must interpolate.

89. A method for producing a representation of a curved surface for display by a computer system, comprising:

specifying a desired shape of the curved surface utilizing a set of geometric constraints;

specifying a functional of the desired shape that is locally minimized and operative to measure a magnitude of variation in a curvature of the desired shape;

producing a representation of the curved surface based on the functional and the set of geometric constraints; and displaying the representation of the curved surface via an output device to create a visual or physical embodiment of the curved surface.

90. The method as recited in claim 89, wherein the functional is an area integral of a sum of a square of an arc length derivative of a maximum principle curvature of the desired shape taken in a maximum principle direction of the desired shape and a square of an arc length derivative of a minimum principle curvature of the desired shape taken in a minimum principle direction of the desired shape.

91. The method as recited in claim 89, wherein the functional is made scale invariant by multiplying the functional by an area of the desired shape.

92. The method as recited in claim 89, wherein the set of geometric constraints includes at least one point that the desired shape of the curved surface must interpolate.

93. The method as recited in claim 89, wherein the set of geometric constraints includes at least one tangent plane that the desired shape of the curved surface must interpolate.

94. The method as recited in claim 89, wherein the set of geometric constraints includes at least one direction of principle curvature of the desired shape that the desired shape of the curved surface must interpolate.

95. The method as recited in claim 89, wherein the set of geometric constraints includes at least one maximum principle curvature of the desired shape that the desired shape of the curved surface must interpolate.

96. The method as recited in claim 89, wherein the set of geometric constraints includes at least one minimum principle curvature of the desired shape that the desired shape of the curved surface must interpolate.

97. The method as recited in claim 89, wherein the set of geometric constraints includes at least one continuous curve of tangent plane specification that the desired shape of the curved surface must interpolate.

98. The method as recited in claim 97, wherein the continuous curve of tangent plane specification further specifies a continuous surface normal curvature in a direction perpendicular to the curve of tangent plane specification that the desired shape of the curved surface must interpolate.

99. The method as recited in claim 89, wherein the set of geometric constraints includes at least one curve of $G^2$ discontinuity specification for the desired shape of the curved surface.

100. The method as recited in claims 89, wherein the set of geometric constraints includes at least one curve $G^1$ discontinuity specification for the desired shape of the curved surface.

101. The method as recited in claim 89, wherein the functional is made scale invariant by multiplying the functional by an area of the desired shape.

\* \* \* \* \*